US012581317B2

(12) United States Patent
Grant et al.

(10) Patent No.: US 12,581,317 B2
(45) Date of Patent: Mar. 17, 2026

(54) SIGNALING A QUASI CO-LOCATED, QCL, RELATION

(71) Applicant: Telefonaktiebolaget LM Ericsson (PUBL), Stockholm (SE)

(72) Inventors: Stephen Grant, Pleasanton, CA (US); Peter Alriksson, Hörby (SE); Emma Wittenmark, Lund (SE)

(73) Assignee: Telefonaktiebolaget LM Ericsson (PUBL), Stockholm (SE)

( * ) Notice: Subject to any disclaimer, the term of this patent is extended or adjusted under 35 U.S.C. 154(b) by 573 days.

(21) Appl. No.: 18/004,752

(22) PCT Filed: Apr. 6, 2022

(86) PCT No.: PCT/SE2022/050343
§ 371 (c)(1),
(2) Date: Jan. 9, 2023

(87) PCT Pub. No.: WO2022/216209
PCT Pub. Date: Oct. 13, 2022

(65) Prior Publication Data
US 2023/0262472 A1 Aug. 17, 2023

Related U.S. Application Data

(60) Provisional application No. 63/171,466, filed on Apr. 6, 2021.

(51) Int. Cl.
*H04W 16/14* (2009.01)

(52) U.S. Cl.
CPC ................................... *H04W 16/14* (2013.01)

(58) Field of Classification Search
CPC ..................................................... H04W 16/14
See application file for complete search history.

(56) References Cited

U.S. PATENT DOCUMENTS

| | | |
|---|---|---|
| 2019/0306832 A1 | 10/2019 | Si et al. |
| 2020/0404537 A1 | 12/2020 | Harada |
| 2023/0353332 A1* | 11/2023 | Wu ........................ H04L 5/0048 |
| 2024/0031110 A1* | 1/2024 | Kim ....................... H04W 56/00 |

FOREIGN PATENT DOCUMENTS

| | | |
|---|---|---|
| WO | WO2019021592 | 1/2019 |
| WO | WO2019215921 A1 | 11/2019 |

OTHER PUBLICATIONS

Notice of Allowance issued for Japanese Patent Application Serial No. 2023-560234—Aug. 27, 2024.
(Continued)

*Primary Examiner* — Curtis B Odom
(74) *Attorney, Agent, or Firm* — Baker Botts L.L.P.

(57) ABSTRACT

According to certain embodiments, a method performed by a wireless device comprises determining a quasi-co location (QCL) relation parameter associated with Frequency Range 2 (FR2). The QCL relation parameter associated with FR2 is determined based on a subCarrierSpacingCommon field of a master information block for FR2 received in signaling from a network node. The method further comprises using the QCL relation parameter associated with FR2 when performing an operation of the wireless device for FR2.

18 Claims, 12 Drawing Sheets

1302

Determining a quasi-co location (QCL) relation parameter associated with Frequency Range 2 (FR2), the QCL relation parameter associated with FR2 determined based on a subCarrierSpacingCommon field received for FR2 in signaling from a network node.

1304

Using the QCL relation parameter associated with FR2 when performing an operation of the wireless device for FR2.

(56)     References Cited

OTHER PUBLICATIONS

3GPP TSG RAN WG1 #104-e; e-Meeting, Jan. 25-Feb. 5, 2021; Agenda item: 8.2.1; Source: Qualcomm Incorporated; Title: Initial access aspects for NR to support operation between 52.6 GHz and 71 GHz (R1-2101453).

3GPP TSG RAN WG1 #104-bis-e; e-Meeting, Apr. 12-20, 2021; Agenda Item: 8.2.1; Source: InterDigital, Inc.; Title: Discussions on initial access aspects (R1-2103448).

3GPP TSG RAN WG1 #100bis, e-Meeting; Title: Remaining issues on the initial access procedure for NR-U; Source: ZTE, Sanechips (R1-2001706)—Apr. 20-30, 2020.

PCT International Search Report issued for International application No. PCT/SE2022/050343—Jul. 19, 2022.

PCT Written Opinion of the International Searching Authority issued for International application No. PCT/SE2022/050343—Jul. 19, 2022.

* cited by examiner

710
Host computer provides user data

720
Host computer initiates transmission carrying the user data to the UE

730
UE receives the user data

611
Host computer executes client application

610
Host computer provides user data

620
Host computer initiates transmission carrying the user data to the UE

630
Base station transmits the user data

640
UE executes client application

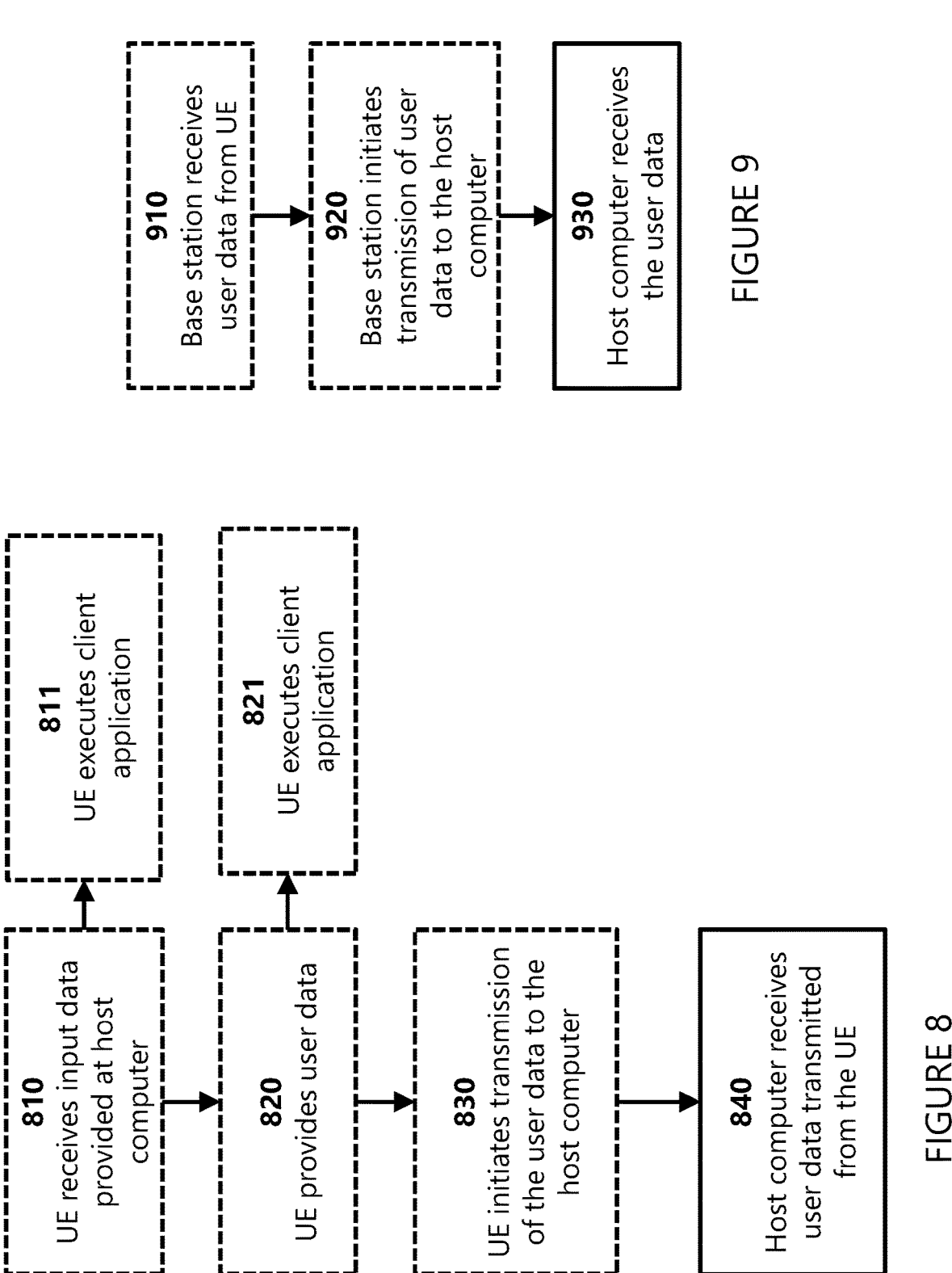

910
Base station receives user data from UE

920
Base station initiates transmission of user data to the host computer

930
Host computer receives the user data

FIGURE 9

811
UE executes client application

821
UE executes client application

810
UE receives input data provided at host computer

820
UE provides user data

830
UE initiates transmission of the user data to the host computer

840
Host computer receives user data transmitted from the UE

FIGURE 8

1002 receiving, from a network node, signaling indicating a quasi-co location (QCL) relation parameter, wherein the signaling indicating the QCL relation parameter comprises one or more available bits in one or more of a *controlReserouseSetSetZero field, a searchSpaceZero field, and/or a* subCarrierSpacingCommon field;

1004 using the QCL relation parameter when performing an operation of the wireless device.

Figure 10

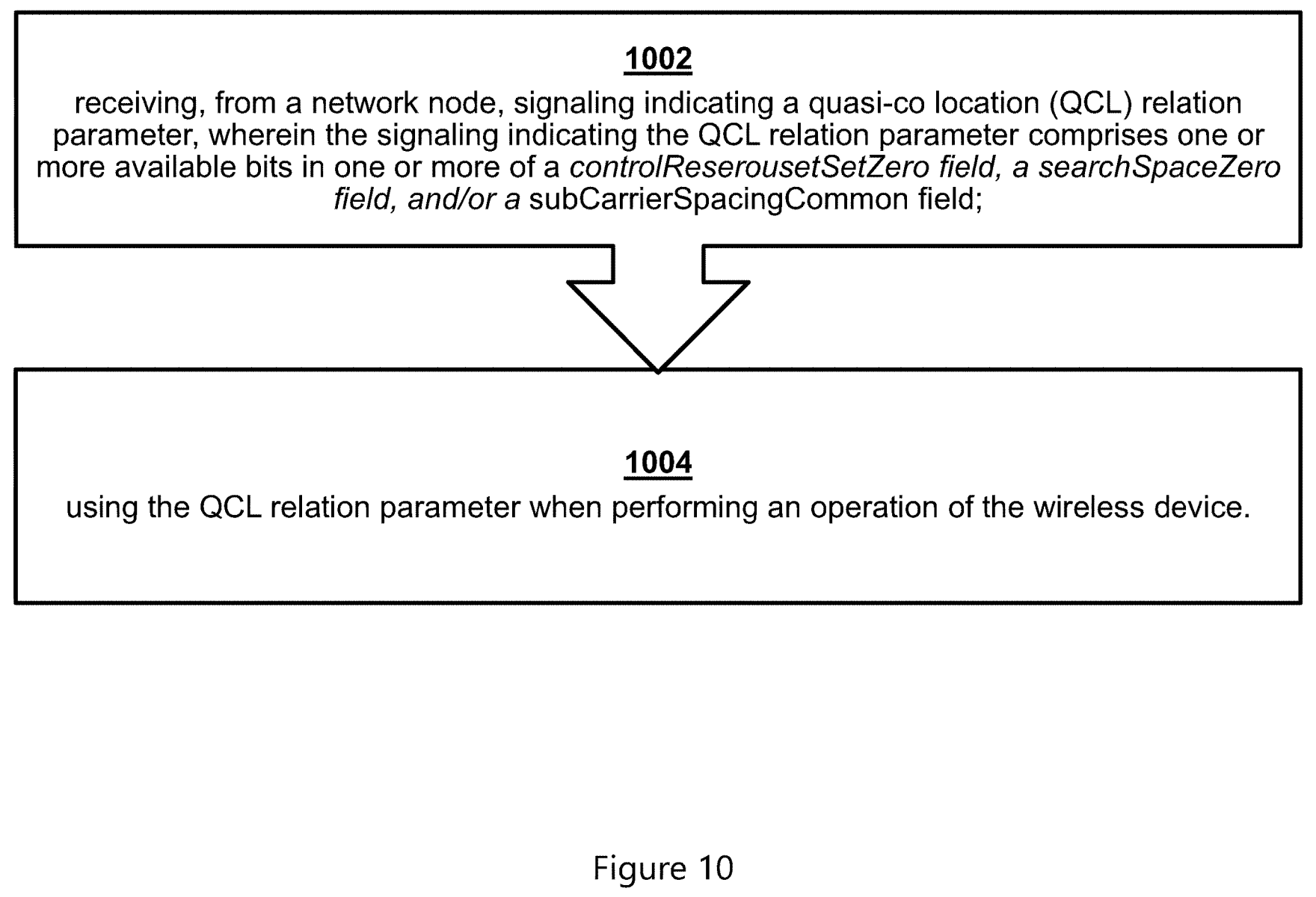

1102 sending, to a wireless device, signaling indicating a quasi-co location (QCL) relation parameter, wherein the signaling indicating the QCL relation parameter comprises one or more of the available bits in one or more of a *controlReserousetSetZero* field, a *searchSpaceZero* field, and/or a *subCarrierSpacingCommon* field.

Figure 13:
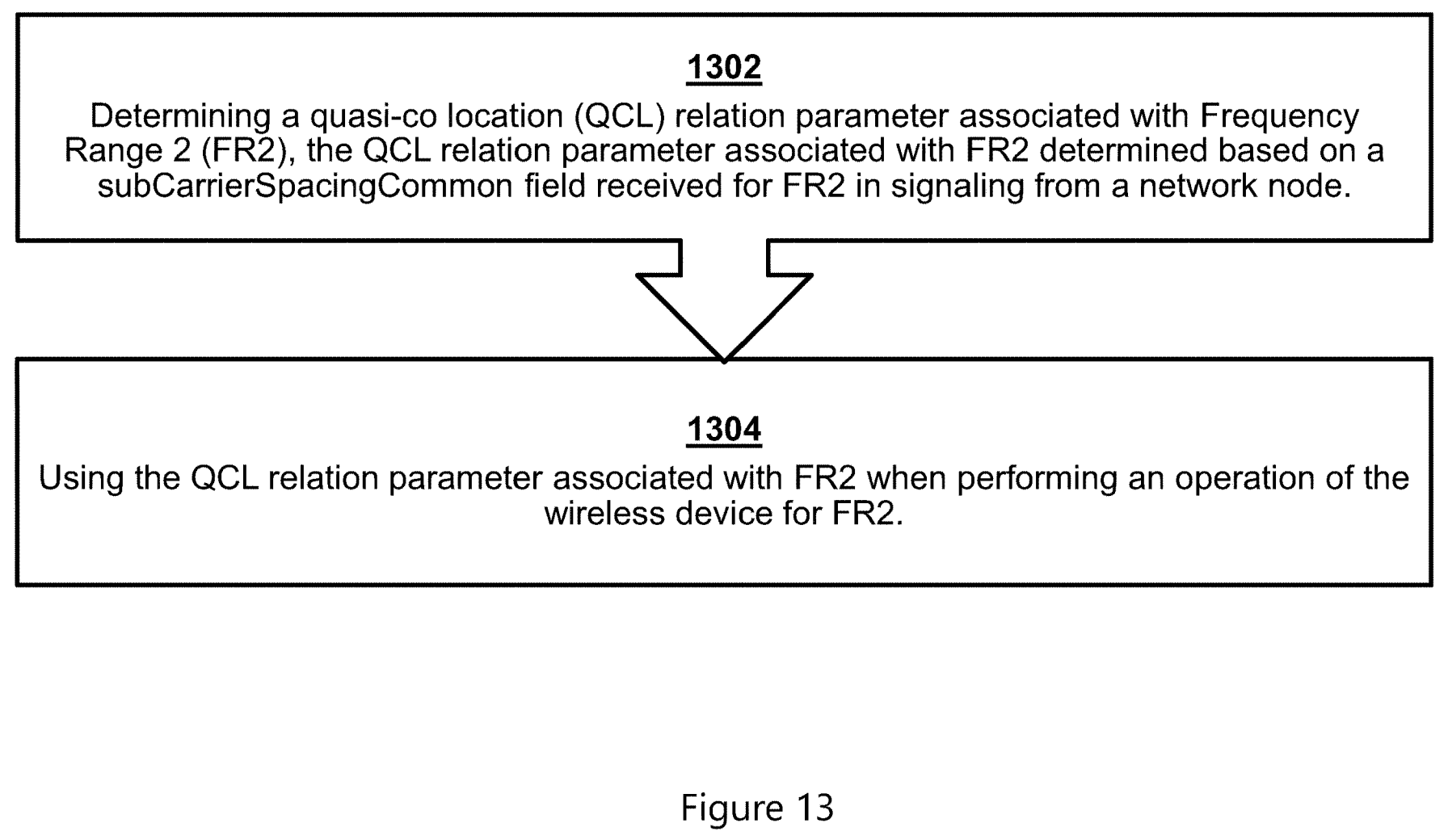

Determining a quasi-co location (QCL) relation parameter associated with Frequency Range 2 (FR2), the QCL relation parameter associated with FR2 determined based on a subCarrierSpacingCommon field received for FR2 in signaling from a network node.

1304

Using the QCL relation parameter associated with FR2 when performing an operation of the wireless device for FR2.

Determining a quasi-co location (QCL) relation parameter associated with Frequency Range 2 (FR2).

1404

Preparing signaling comprising a subCarrierSpacingCommon field for FR2, the subCarrierSpacingCommon field for FR2 indicating the QCL relation parameter associated with FR2.

1406

Sending the signaling to a wireless device.

SIGNALING A QUASI CO-LOCATED, QCL, RELATION

PRIORITY

This nonprovisional application is a U.S. National Stage Filing under 35 U.S.C. § 371 of International Patent Application Serial No. PCT/SE2022/050343 filed Apr. 6, 2022 and entitled "SIGNALING A QUASI CO-LOCATED, QCL, RELATION" which claims priority to U.S. Provisional Patent Application No. 63/171,466 filed Apr. 6, 2021 both of which are hereby incorporated by reference in their entirety.

TECHNICAL FIELD

Certain embodiments of the present disclosure relate, in general, to signaling a QCL relation.

BACKGROUND

Synchronization Signal (SS)/Physical Broadcast Channel (PBCH) Block

New Radio (NR) defines two types of synchronization signals (SS), primary synchronization signals (PSS) and secondary synchronization signals (SSS). NR also defines one broadcast channel, physical broadcast channel (PBCH). Further PSS, SSS, and PBCH are transmitted in one SS/PBCH block. One or multiple SS/PBCH block(s) can be transmitted within one SS/PBCH period. For a half frame with SS/PBCH blocks, the first symbol indexes for candidate SS/PBCH blocks are determined according to the subcarrier spacing of SS/PBCH blocks as described in Third Generation Partnership Project (3GPP) Technical Specification (TS) 38.213.

The candidate SS/PBCH blocks in a half frame are indexed in an ascending order in time from 0 to L−1. A user equipment (UE) determines certain least significant bits (LSBs) of a candidate SS/PBCH block index per half frame from a one-to-one mapping with an index of the Demodulation Reference Signal (DM-RS) sequence transmitted in the PBCH. In particular, the UE determines 2 LSBs (for L=4) or 3 LSBs (for L>4). For L=64, the UE determines the 3 most significant bits (MSBs) of the candidate SS/PBCH block index per half frame by PBCH payload bits. In addition, a half-frame indicator is present in the PBCH payload bits.

The UE may assume that SS/PBCH blocks transmitted with the same block index on the same center frequency location are quasi co-located (QCL) with respect to Doppler spread, Doppler shift, average gain, average delay, delay spread, and, when applicable, spatial receive (Rx) parameters. The UE shall not assume quasi co-location for any other SS/PBCH block transmissions.

Discovery Burst Transmission Window

For operation with shared spectrum channel access as defined in Rel-16, a UE assumes that transmission of SS/PBCH blocks in a half frame is within a discovery burst transmission window that starts from the first symbol of the first slot in a half-frame. The UE can be provided per serving cell by DiscoveryBurst-WindowLength-r16 a duration of the discovery burst transmission window. If DiscoveryBurst-WindowLength-r16 is not provided, the UE assumes that the duration of the discovery burst transmission window is a half frame. For a serving cell, the UE assumes that a periodicity of the discovery burst transmission window is same as a periodicity of half frames for receptions of SS/PBCH blocks in the serving cell. The UE assumes that one or more SS/PBCH blocks indicated by ssb-PositionsIn-Burst may be transmitted within the discovery burst transmission window and have candidate SS/PBCH blocks indexes corresponding to SS/PBCH block indexes provided by ssb-PositionsInBurst. If MSB k, k≥1, of ssb-PositionsIn-Burst is set to 1, the UE assumes that SS/PBCH block(s) within the discovery burst transmission window with candidate SS/PBCH block index(es) corresponding to SS/PBCH block index equal to k−1 may be transmitted: if MSB k is set to 0, the UE assumes that the SS/PBCH block(s) are not transmitted.

Candidate SS/PBCH Block Index Vs SS/PBCH Block Index

To allow multiple candidate SS/PBCH block indexes to have the same QCL properties, Release 16 (Rel-16) of the 3GPP NR standard introduced both a notion of candidate SS/PBCH block index and SS/PBCH block index.

For operation without shared spectrum channel access, an SS/PBCH block index is the same as a candidate SS/PBCH block index.

For operation with shared spectrum channel access, a UE assumes that SS/PBCH blocks in a serving cell that are within a same discovery burst transmission window or across discovery burst transmission windows are quasi co-located with respect to average gain, QCL-TypeA, and QCL-TypeD properties, when applicable [see 3GPP TS 38.214], if a value of $$\left(N_{DM-RS}^{PBCH} \bmod N_{SSB}^{QCL}\right)$$

is same among the SS/PBCH blocks $$N_{DM-RS}^{PBCH}$$

is an index of a DM-RS sequence transmitted in a PBCH of a corresponding SS/PBCH block, and $$N_{SSB}^{QCL}$$

is either provided by ssb-PositionQCL-r16 or, if ssb-Posi-tionQCL-r16 is not provided, obtained from a MIB provided by a SS/PBCH block according to Table 4.1-1 with $k_{SSB}$<24 [see 3GPP TS 38.211]. The subCarrierSpacingCommon field indicates subcarrier spacing (SCS) of Remaining Minimum System Information (RMSI) only for the case of operation without shared spectrum channel access. The UE can determine an SS/PBCH block index according to $$\left(N_{DM-RS}^{PBCH} \bmod N_{SSB}^{QCL}\right),$$

or according to $$\left(\bar{\imath} \bmod N_{SSB}^{QCL}\right)$$

where $\bar{\imath}$ is the candidate SS/PBCH block index. The UE assumes that within a discovery burst transmission window, a number of transmitted SS/PBCH blocks on a serving cell is not larger than $N_{SSB}^{QCL}$ and a number of transmitted SS/PBCH blocks with a same
SS/PBCH block index is not larger than one.

TABLE 1

Mapping between the combination of subCarrierSpacingCommon
and LSB of ssb-SubcarrierOffset to $N_{SSB}^{QCL}$

| subCarrierSpacingCommon | LSB of ssb-SubcarrierOffset | $N_{SSB}^{QCL}$ |
|---|---|---|
| scs15or60 | 0 | 1 |
| scs15or60 | 1 | 2 |
| scs30or120 | 0 | 4 |
| scs30or120 | 1 | 8 |

MIB Content

As described in 3GPP TS 38.331, the master information
block (MIB) contains the following fields:

MIB

The MIB includes the system information transmitted on
BCH.

MIB

```
-- ASN1START
-- TAG-MIB-START
MIB ::=                    SEQUENCE {
    systemFrameNumber              BIT STRING (SIZE (6)),
    subCarrierSpacingCommon        ENUMERATED {scs15or60, scs30or120},
    ssb-SubcarrierOffset           INTEGER (0..15),
    dmrs-TypeA-Position            ENUMERATED {pos2, pos3},
    pdcch-ConfigSIB1               PDCCH-ConfigSIB1,
    cellBarred                     ENUMERATED {barred, notBarred},
    intraFreqReselection       ENUMERATED {allowed, notAllowed},
    spare                      BIT STRING (SIZE (1))
}
-- TAG-MIB-STOP
-- ASN1STOP
```

The parameter ssb-SubcarrierOffset indicates $k_{SSB}$. For fre-
quency range 2 (FR2) in Rel-15/16, the parameter ssb-
SubCarrierOffset can take one of 16 different values. The
first 12 values (0 . . . 11) indicate the subcarrier offset
between the lowest indexed (first) subcarrier of the
SS/PBCH block and the lowest-indexed (first) subcarrier of
the resource block (RB) that overlaps the first subcarrier of
the SS/PBCH block. This indication is needed since the
SS/PBCH block is not always aligned with RB boundaries
in a bandwidth part (BWP). If the UE receives a value in the
range 0 . . . 11, it interprets this as a joint indication of the
subcarrier offset and that a CORESET0 for Type0-Physical
Downlink Control Channel (PDCCH) common search space
(CSS) set is present. This means that the UE is able to
monitor PDCCH in the Type0-PDCCH CSS to receive
scheduling of the Physical Downlink Shared Channel
(PDSCH) that carries system information block 1 (SIB1).

The values {12,13, and 15} are used to indicate that the
SS/PBCH block that the UE detects does not indicate a
CORESET0/Type0-PDCCH configuration in MIB, i.e.,
CORESET0/Type0-PDCCH are absent. Depending on
exactly which value is indicated, the signaling supports
indication of a second SS/PBCH block that potentially
indicates that a CORESET0/Type0-PDCCH is present.

The behavior for value 15 for FR2 (31 for frequency range
1 (FR1)) is specified in 3GPP TS 38.213 Section 13 as
follows:

If a UE detects a SS/PBCH block and determines that a CORESET for
Type0-PDCCH CSS set is not present, and for $k_{SSB}$ = 31 for FR1 or for
$k_{SSB}$ = 15 for FR2, the UE determines that there is no SS/PBCH block
having an associated Type0-PDCCH CSS set within a GSCN range $\left[ N_{GSCN}^{Reference} - N_{GSCN}^{Start}, N_{GSCN}^{Reference} + N_{GSCN}^{End} \right]$. $N_{GSCN}^{Start}$ and $N_{GSCN}^{End}$ are are respectively determined by controlResourceSetZero and
searchSpaceZero in pdcch-ConfigSIB1. If the GSCN range is $\left[ N_{GSCN}^{Reference}, N_{GSCN}^{Reference} \right]$, the UE determines that there is no information for a second SS/PBCH block with a CORESET for an associated
Type0-PDCCH CSS set on the detected SS/PBCH block.

The value 14 is reserved and has no meaning in Rel-15/
16.

The parameter pdcch-ConfigSIB1 in MIB indicates the
CORESET0 and Type0-PDCCH CSS set configurations that
enable the UE to decode PDCCH that schedules a PDSCH
carrying SIB1:

PDCCH-ConfigSIB1

The information element (IE) called PDCCH-ConfigSIB1
is used to configure CORESET #0 and search space #0.

PDCCH-ConfigSIB1 information element

```
-- ASN1START
-- TAG-PDCCH-CONFIGSIB1-START
PDCCH-ConfigSIB1 ::=          SEQUENCE {
    controlResourceSetZero           ControlResourceSetZero,
    searchSpaceZero                  SearchSpaceZero
}
-- TAG-PDCCH-CONFIGSIB1-STOP
-- ASN1STOP
```

Both the parameters controlResourceSetZero and
searchSpaceZero are integers from 0 . . . 15. The parameter
controlResourceSetZero indexes one row out of a length 16
table indicating the CORESET0 configuration, i.e., number
of RBs, number of orthogonal frequency division multiplex-
ing (OFDM) symbols, SSB-CORESET0 multiplexing pat-
tern, and SSB-CORESET0 RB offset. The parameter
searchSpaceZero indicates one row from a length 16 table
indicating the Type0-PDCCH CSS set configuration includ-
ing time domain PDCCH monitoring locations for the
PDCCH that schedules the PDSCH carrying SIB1.

One example of the CORESET0 configuration table is
shown below: more examples are given in 3GPP TS 38.213.

TABLE 2

Set of resource blocks and slot symbols of CORESET for Type0-PDCCH
search space set when {SS/PBCH block, PDCCH} SCS is {120, 120} kHz

| Index | SS/PBCH block and CORESET multiplexing pattern | Number of RBs $N_{RB}^{CORESET}$ | Number of Symbols $N_{Symb}^{CORESET}$ | Offset (RBs) |
|---|---|---|---|---|
| 0 | 1 | 24 | 2 | 0 |
| 1 | 1 | 24 | 2 | 4 |
| 2 | 1 | 48 | 1 | 14 |
| 3 | 1 | 48 | 2 | 14 |
| 4 | 3 | 24 | 2 | −20 if $k_{SSB} = 0$ −21 if $k_{SSB} > 0$ |
| 5 | 3 | 24 | 2 | 24 |
| 6 | 3 | 48 | 2 | −20 if $k_{SSB} = 0$ −21 if $k_{SSB} > 0$ |
| 7 | 3 | 48 | 2 | 48 |
| 8 | | Reserved | | |
| 9 | | Reserved | | |
| 10 | | Reserved | | |
| 11 | | Reserved | | |
| 12 | | Reserved | | |
| 13 | | Reserved | | |
| 14 | | Reserved | | |
| 15 | | Reserved | | |

One example of the Type0)-PDCCH configuration table is shown below: more examples are given in 3GPP TS 38.213.

TABLE 3

PDCCH monitoring occasions for Type0-PDCCH CSS
set—SS/PBCH block and CORESET multiplexing pattern 3
and {SS/PBCH block, PDCCH} SCS {120, 120}
kHz (based on 3GPP TS 38.213 Table 13-15)

| Index | PDCCH monitoring occasions (System Frame Number (SFN) and slot number) | First symbol index (k = 0, 1, . . . 15) |
|---|---|---|
| 0 | $SFN_C = SFN_{SSB, i}$ $n_C = n_{SSB, i}$ | 4, 8, 2, 6 in i = 4k, i = 4k + 1, i = 4k + 2, i = 4k + 3 |
| 1 | Reserved | |
| 2 | Reserved | |
| 3 | Reserved | |
| 4 | Reserved | |
| 5 | Reserved | |
| 6 | Reserved | |
| 7 | Reserved | |
| 8 | Reserved | |
| 9 | Reserved | |
| 10 | Reserved | |
| 11 | Reserved | |
| 12 | Reserved | |
| 13 | Reserved | |
| 14 | Reserved | |
| 15 | Reserved | |

SUMMARY

There currently exist certain challenge(s). For example, as discussed above, Release 16 uses a combination of one LSB bit from ssb-SubCarrierOffset and the field subCarrierSpacingCommon to indicate $$N_{SSB}^{QCL}$$

via MIB signaling. Inis mapping relies on that the initial downlink (DL) bandwidth part (BWP) SCS and the SS/PBCH SCS being the same such that one bit is available in ssb-SubCarrierOffset to be re-purposed.

In FR1, $k_{SSB} \in$ {0, 1, 2, . . . , 23} and is expressed in 15 kHz SCS. The 4 least significant bits of $k_{SSB}$ are given by the higher-layer parameter ssb-SubCarrierOffset and the most significant bit of $k_{SSB}$ is given by $\overline{a}_{\bar{A}+5}$ in the PBCH payload.

For FR2, $k_{SSB} \in$ {0, 1, 2, . . . , 11} and is expressed in terms of the subcarrier spacing provided by the higher-layer parameter subCarrierSpacingCommon. All 4 bits of $k_{SSB}$ are given by the higher-layer parameter ssb-SubCarrierOffset. It should be noted that for FR2 $\overline{a}_{\bar{A}+5}$ is used to signal the SS/PBCH block index.

In Rel-16 of NR for unlicensed spectrum (NR-U), the least significant bit of ssb-SubCarrierOffset could be repurposed because $k_{SSB}$ is only allowed to take even values. However, it should be noted that because the range is 0-23, there are still 12 possible values, allowing a 30 KHz SS/PBCH block to be placed anywhere within a 30 kHz common resource block (RB).

Because it has been agreed to support 120 kHz SS/PBCH block and 120 KHz CORESET #0 for Type0-PDCCH, it seems probable that all 4 bits of ssb-SubCarrierOffset will be needed to support the full $k_{SSB}$ range 0-11, unless the RAN4 synchronization and channel raster design allows the range to be reduced to 8 values (3 bits).

Thus, the Rel-16 way of signaling the QCL relation parameter $$N_{SSB}^{QCL}$$

in MIB is not feasible for FR2 and a new method is needed.

Certain aspects of the present disclosure and their embodiments may provide solutions to these or other challenges. For example, certain embodiments allow for signaling the QCL relation parameter $$N_{SSB}^{QCL}$$

when the Rel-16 way is not feasible, e.g., for FR2. For example, in certain embodiments, the SCS of a synchronization signal block (SSB) and the initial BWP are the same, and thus subCarrierSpacingCommon can be repurposed to indicate the QCL relation parameter for FR2.

There are, proposed herein, various embodiments which address one or more of the issues disclosed herein.

According to certain embodiments, a method performed by a wireless device comprises determining a QCL relation parameter associated with FR2. The QCL relation parameter associated with FR2 is determined based on a subCarrierSpacingCommon field of a master information block for FR2 received in signaling from a network node. The method further comprises using the QCL relation parameter associated with FR2 when performing an operation of the wireless device for FR2.

According to certain embodiments, a wireless device comprises power supply circuitry and processing circuitry. The power supply circuitry is configured to supply power to the wireless device. The processing circuitry is configured to determine a QCL relation parameter associated with FR2. The QCL relation parameter associated with FR2 is determined based on a subCarrierSpacingCommon field of a master information block for FR2 received in signaling from a network node. The processing circuitry is further configured to use the QCL relation parameter associated with FR2 when performing an operation of the wireless device for FR2.

The above-described wireless device and/or method performed by a wireless device may include one or more additional features, such as one or more of the following features:

In certain embodiments, the QCL relation parameter associated with FR2 is determined using the subCarrierSpacingCommon field for FR2 without using any other field received in the signaling from the network node.

In certain embodiments, the QCL relation parameter associated with FR2 is determined based on a single bit received from the network node, the single bit received in the subCarrierSpacingCommon field for FR2.

In certain embodiments, the subCarrierSpacingCommon field for FR2 indicates the QCL relation parameter associated with FR2 instead of indicating subcarrier spacing. For example, in certain embodiments, the subCarrierSpacingCommon field for FR2 indicates the QCL relation parameter associated with FR2 instead of indicating the subcarrier spacing when the subcarrier spacing is the same for an SSB and an initial downlink bandwidth part.

In certain embodiments, the subCarrierSpacingCommon field for FR2 is a one-bit field configured to indicate either a first value or a second value of the QCL relation parameter associated with FR2. For example, in certain embodiments, the first value is 32 and the second value is 64.

In certain embodiments, the wireless device operates in unlicensed spectrum in the FR2.

Certain embodiments further comprise determining a QCL relation parameter associated with FR1 and using the QCL relation parameter associated with FR1 when performing an operation of the wireless device for FR1. The QCL relation parameter associated with FR1 is determined based on a subCarrierSpacingCommon field for FR1 and a ssb-SubcarrierOffset field for FR1, each of which is received in the signaling from the network node. In certain embodiments, the QCL relation parameter associated with FR1 is determined based on only two bits received from the network node, one bit received in the subCarrierSpacingCommon field for FR1 and the other bit received in the ssb-SubcarrierOffset field for FR1.

In certain embodiments, the operation of the wireless device comprises assuming quasi co-location for SS and PBCH blocks transmitted with a same block index on a same center frequency location, the quasi co-location assumed with respect to one or more of: Doppler spread, Doppler shift, average gain, average delay, delay spread, and/or spatial receive (Rx) parameters. For example, in certain embodiments, the block index is determined as a modulo of a block index indication indicated by an SS/PBCH block and the QCL relation parameter.

According to certain embodiments, a method performed by a network node comprises sending signaling to a wireless device. The signaling comprises a subCarrierSpacingCommon field of a master information block for FR2. The subCarrierSpacingCommon field for FR2 indicates a QCL relation parameter associated with FR2

According to certain embodiments, a network node comprises power supply circuitry and processing circuitry. The power supply circuitry is configured to supply power to the network node. The processing circuitry is configured to send signaling to a wireless device. The signaling comprises a subCarrierSpacingCommon field of a master information block for FR2. The subCarrierSpacingCommon field for FR2 indicates a QCL relation parameter associated with FR2.

The above-described network node and/or method performed by a network node may include one or more additional features, such as one or more of the following features:

In certain embodiments, the QCL relation parameter associated with FR2 is indicated by the network node using only the subCarrierSpacingCommon field for FR2 without using any other field sent in the signaling to the wireless device.

In certain embodiments, the QCL relation parameter associated with FR2 is indicated based on a single bit sent to the wireless device, the single bit sent in the subCarrierSpacingCommon field for FR2.

In certain embodiments, the subCarrierSpacingCommon field for FR2 indicates the QCL relation parameter associated with FR2 instead of indicating subcarrier spacing. For example, in certain embodiments, the subCarrierSpacingCommon field for FR2 indicates the QCL relation parameter associated with FR2 instead of indicating the subcarrier spacing when the subcarrier spacing is the same for an SSB and an initial downlink bandwidth part.

In certain embodiments, the subCarrierSpacingCommon field for FR2 is a one-bit field configured to indicate either a first value or a second value of the QCL relation parameter associated with FR2. For example, in certain embodiments, the first value is 32 and the second value is 64.

In certain embodiments, the network node operates in unlicensed spectrum in the FR2.

In certain embodiments, the signaling sent to the wireless device further comprises a subCarrierSpacingCommon field for FR1 and a ssb-SubcarrierOffset field for FR1. Together, these fields indicate a QCL relation parameter associated with FR1. For example, in certain embodiments, only two bits sent from the network node to the wireless device are used to indicate the QCL relation parameter associated with FR1, one bit sent in the subCarrierSpacingCommon field for FR1 and the other bit sent in the ssb-SubcarrierOffset field for FR1.

Prior to sending the signaling to the wireless device, certain embodiments determine the QCL relation parameter associated with FR2 and prepare the signaling to be sent in order to indicate the QCL relation parameter associated with FR2.

In certain embodiments, the QCL relation parameter indicates that the wireless device is to assume that SS and PBCH blocks transmitted with a same block index on a same center frequency location are quasi co-located with respect to one or more of: Doppler spread, Doppler shift, average gain, average delay, delay spread, and/or spatial receive (Rx) parameters. In certain embodiments, the signaling sent to the wireless device further comprises a block index indication indicated by an SS/PBCH block, wherein the block index indication enables the wireless device to determine the block index as a modulo of the block index indication and the QCL relation parameter.

Certain embodiments may provide one or more of the following technical advantage(s). For example, certain embodiments allow for signalling the QCL relation parameter when the Rel-16 way is not feasible, e.g., for FR2. This facilitates using QCL, e.g., for FR2. QCL may simplify certain operations performed by the UE. For example, the UE may assume that SS/PBCH blocks transmitted with the same block index on the same center frequency location are QCL with respect to Doppler spread, Doppler shift, average gain, average delay, delay spread, and, when applicable, spatial receive (Rx) parameters. Assuming QCL may reduce the processing burden that may otherwise be required for the UE to separately determine the parameters.

BRIEF DESCRIPTION OF THE DRAWINGS

For a more complete understanding of the disclosed embodiments and their features and advantages, reference is now made to the following description, taken in conjunction with the accompanying drawings, in which:

FIG. 8 illustrates examples of methods implemented in a communication system including a host computer, a base station and a user equipment in accordance with some embodiments.

FIG. 9 illustrates examples of methods implemented in a communication system including a host computer, a base station and a user equipment in accordance with some embodiments.

FIG. 10 illustrates an example of a method in accordance with some embodiments.

FIG. 11 illustrates an example of a method in accordance with some embodiments.

FIG. 13 illustrates an example of a method that may be performed by a wireless device in accordance with some embodiments.

DETAILED DESCRIPTION

Figure 1:
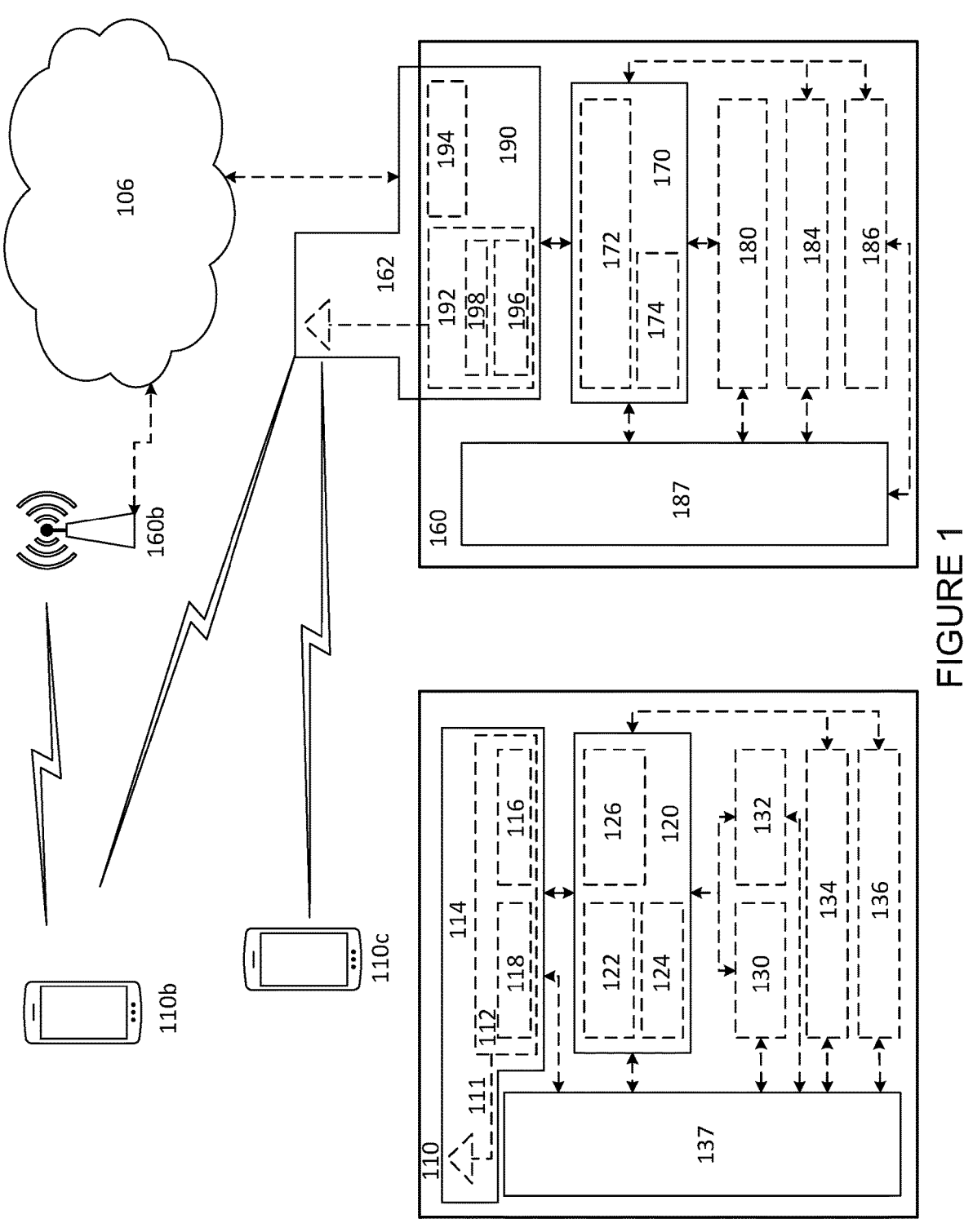
FIG. 1 illustrates an example of a wireless network in accordance with some embodiments.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein: rather, these embodiments are provided by way of example to convey the scope of the subject matter to those skilled in the art.

Embodiment #1

In this embodiment, the most significant bit of the length-4 bit field controlResourceSetZero is used to signal two values of $$N_{SSB}^{QCL}.$$

In one non-limiting example, the two values are 32 and 64. This is possible since as of now, only values in the range 0-7 of the 16 possible values of controlResourceSetZero are needed to signal one of the rows of the CORESET0 configuration table (see Table 2, discussed above).

Embodiment #2

In this embodiment up to three most significant bits from the length-4 bit field searchSpaceZero in combination with the most significant bit in controlResourceSetZero is used to signal up to 16 values of $$N_{SSB}^{QCL}$$

for SS/PBCH block and CORESET multiplexing pattern 2 and 3. This is possible since as of now only one value out of the 16 possible values of searchSpaceZero are needed to signal the single row of the Type0-PDCCH configuration table (see Table 3, discussed above).

That is, the UE first reads controlResourceSetZero and if it determines that multiplexing pattern 2 or 3 is used, the (up to) three MSB of searchSpaceZero are interpreted in combination with the MSB of controlResourceSetZero to signal (up to) 10 values of $$N_{SSB}^{QCL}.$$

In case multiplexing pattern 1 is used, the (up to) three MSB of searchSpaceZero are assumed to be zero for the purpose of signaling $$N_{SSB}^{QCL}.$$

Note that for multiplex pattern 1, the three MSB bits of searchSpaceZero are still used to signal the PDCCH monitoring occasions for Type0-PDCCH CSS set as in the prior art. One non-limiting example of how the bits map to values of

$$N_{SSB}^{QCL}$$

when only two MSB from searchSpaceZero is used is given below. The method can easily be extended to more or less MSB(s) of searchSpaceZero if needed. Note that for multiplex pattern 1, only the first two rows are applicable.

TABLE 4

| $N_{SSB}^{QCL}$ | MSB(s) of searchSpaceZero | MSB of controlResourceSetZero |
|---|---|---|
| 64 | 00 | 0 |
| 32 | 00 | 1 |
| 16 (pattern 2 or 3 only) | 01 | 0 |
| 8 (pattern 2 or 3 only) | 01 | 1 |
| 4 (pattern 2 or 3 only) | 10 | 0 |
| 2 (pattern 2 or 3 only) | 10 | 1 |
| 1 (pattern 2 or 3 only) | 11 | 0 |
| reserved | 11 | 1 |

Embodiment #3

In case the SSB and initial downlink bandwidth part sub-carrier spacing is the same, the one-bit-field subCarrierSpacingCommon becomes redundant and can be used to signal two values of $$N_{SSB}^{QCL}.$$

In one non-limiting example, the values are 32 and 64.

Embodiment #4

In case the SSB and initial downlink bandwidth part sub-carrier spacing is the same, the one-bit-field subCarrierSpacingCommon becomes redundant and can be used together with one MSB from controlResourceSetZero to signal four values of $$N_{SSB}^{QCL}.$$

In one non-limiting example, the values are 8, 16, 32 and 64.

Embodiment #5

This embodiment is only feasible if no SIB1 is transmitted based on this SSB, that is no CORESET for Type0-PDCCH CSS set is present. If $k_{SSB}$ is reserved (i.e. =14 in FR2), the UE will determine that no CORESET for Type0-PDCCH CSS set is present and instead interpret the bits of ControlResourceSetZero and/or searchSpaceZero to signal different values of $$N_{SSB}^{QCL}.$$

Embodiment #6

In this embodiment, the two last values or searchSpaceZero are used in combination with the MSB of controlResourceSetZero. The two values of searchSpaceZero in combination with one bit of controlResourceSetZero can signal four values of $N_{SSB}^{QCL}$. One non-limiting example is given below.

TABLE 5

| $N_{SSB}^{QCL}$ | Value of searchSpaceZero | MSB of controlResourceSetZero |
|---|---|---|
| 64 | 14 | 0 |
| 32 | 14 | 1 |
| 16 | 15 | 0 |
| 8 | 15 | 1 |

Embodiment #7

This embodiment is a combination of Embodiment #4 and #6 which can be used to signal 8 different values of $$N_{SSB}^{QCL}.$$

TABLE 6

| $N_{SSB}^{QCL}$ | Value of searchSpaceZero | MSB of controlResourceSetZero | subCarrierSpacingCommon |
|---|---|---|---|
| 64 | 14 | 0 | 0 |
| 32 | 14 | 1 | 0 |
| 16 | 15 | 0 | 0 |
| 8 | 15 | 1 | 0 |
| 4 | 14 | 0 | 1 |
| 2 | 14 | 1 | 1 |
| 1 | 15 | 0 | 1 |
| reserved | 15 | 1 | 1 |

Embodiment #7

Similar to the above embodiments, in this embodiment the signaled values "spare" bit in MIB is used with any combination of one or more of the available bits in one or more of the fields controlReserousetSetZero, searchSpaceZero, subCarrierSpacingCommon to indicate a plurality of values of $$N_{SSB}^{QCL}.$$

Although the subject matter described herein may be implemented in any appropriate type of system using any suitable components, the embodiments disclosed herein are described in relation to a wireless network, such as the example wireless network illustrated in FIG. 1. For simplicity, the wireless network of FIG. 1 only depicts network 106, network nodes 160 and 160*b*, and WDs 110, 110*b*, and 110*c*. In practice, a wireless network may further include any additional elements suitable to support communication between wireless devices or between a wireless device and another communication device, such as a landline telephone, a service provider, or any other network node or end device.

Of the illustrated components, network node 160 and wireless device (WD) 110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable second, third, fourth, or fifth generation (2G, 3G, 4G, or 5G) standards: wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 160 and WD 110 comprise various components described in more detail below: These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., Mobile Switching Centers (MSCs), Mobility Management Entities (MMEs)), Operation and Maintenance (O&M) nodes, Operations Support System (OSS) nodes, Self-Optimized Network (SON) nodes, positioning nodes (e.g., Evolved-Serving Mobile Location Centre (E-SMLCs)), and/or Minimization of Drive Tests (MDTs). As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 1, network node 160 includes processing circuitry 170, device readable medium 180, interface 190, auxiliary equipment 184, power source 186, power circuitry 187, and antenna 162. Although network node 160 illustrated in the example wireless network of FIG. 1 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 160 are depicted as single boxes located within a larger box, or nested within multiple boxes, in practice, a network node may comprise multiple different physical components that make up a single illustrated component (e.g., device readable medium 180 may comprise multiple separate hard drives as well as multiple RAM modules).

Similarly, network node 160 may be composed of multiple physically separate components (e.g., a NodeB component and a RNC component, or a BTS component and a BSC component, etc.), which may each have their own respective components. In certain scenarios in which network node 160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 160 may be configured to support multiple radio access technologies (RATs). In such embodiments, some components may be duplicated (e.g., separate device readable medium 180 for the different RATs) and some components may be reused (e.g., the same antenna 162 may be shared by the RATs). Network node 160 may also include multiple sets of the various illustrated components for different wireless technologies integrated into network node 160, such as, for example, GSM, wide Code Division Multiplexing Access (WCDMA), Long-Term Evolution (LTE), NR, WiFi, or Bluetooth wireless technologies. These wireless technologies may be integrated into the same or different chip or set of chips and other components within network node 160.

Processing circuitry 170 is configured to perform any determining, calculating, or similar operations (e.g., certain obtaining operations) described herein as being provided by a network node. These operations performed by processing circuitry 170 may include processing information obtained by processing circuitry 170 by, for example, converting the obtained information into other information, comparing the obtained information or converted information to information stored in the network node, and/or performing one or more operations based on the obtained information or converted information, and as a result of said processing making a determination.

Processing circuitry 170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 160 components, such as device readable medium 180, network node 160 functionality. For example, processing circuitry 170 may execute instructions stored in device readable medium 180 or in memory within processing circuitry 170. Such functionality may include providing any of the various wireless features, functions, or benefits discussed herein. In some embodiments, processing circuitry 170 may include a system on a chip (SOC).

In some embodiments, processing circuitry 170 may include one or more of radio frequency (RF) transceiver circuitry 172 and baseband processing circuitry 174. In some embodiments, radio frequency (RF) transceiver circuitry 172 and baseband processing circuitry 174 may be on separate chips (or sets of chips), boards, or units, such as radio units and digital units. In alternative embodiments, part or all of RF transceiver circuitry 172 and baseband processing circuitry 174 may be on the same chip or set of chips, boards, or units In certain embodiments, some or all of the functionality described herein as being provided by a network node, base station, eNB or other such network device may be performed by processing circuitry 170 executing instructions stored on device readable medium 180 or memory within processing circuitry 170. In alternative embodiments, some or all of the functionality may be provided by processing circuitry 170 without executing instructions stored on a separate or discrete device readable medium, such as in a hard-wired manner. In any of those embodiments, whether executing instructions stored on a device readable storage medium or not, processing circuitry 170 can be configured to perform the described functionality. The benefits provided by such functionality are not limited to processing circuitry 170 alone or to other components of network node 160, but are enjoyed by network node 160 as a whole, and/or by end users and the wireless network generally.

Device readable medium 180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 170. Device readable medium 180 may store any suitable instructions, data or information, including a computer program, software, an application including one or more of logic, rules, code, tables, etc. and/or other instructions capable of being executed by processing circuitry 170 and, utilized by network node 160. Device readable medium 180 may be used to store any calculations made by processing circuitry 170 and/or any data received via interface 190. In some embodiments, processing circuitry 170 and device readable medium 180 may be considered to be integrated.

Interface 190 is used in the wired or wireless communication of signalling and/or data between network node 160, network 106, and/or WDs 110. As illustrated, interface 190 comprises port(s)/terminal(s) 194 to send and receive data, for example to and from network 106 over a wired connection. Interface 190 also includes radio front end circuitry 192 that may be coupled to, or in certain embodiments a part of, antenna 162. Radio front end circuitry 192 comprises filters 198 and amplifiers 196. Radio front end circuitry 192 may be connected to antenna 162 and processing circuitry 170. Radio front end circuitry may be configured to condition signals communicated between antenna 162 and processing circuitry 170. Radio front end circuitry 192 may receive digital data that is to be sent out to other network nodes or WDs via a wireless connection. Radio front end circuitry 192 may convert the digital data into a radio signal having the appropriate channel and bandwidth parameters using a combination of filters 198 and/or amplifiers 196. The radio signal may then be transmitted via antenna 162. Similarly, when receiving data, antenna 162 may collect radio signals which are then converted into digital data by radio front end circuitry 192. The digital data may be passed to processing circuitry 170. In other embodiments, the interface may comprise different components and/or different combinations of components.

In certain alternative embodiments, network node 160 may not include separate radio front end circuitry 192, instead, processing circuitry 170 may comprise radio front end circuitry and may be connected to antenna 162 without separate radio front end circuitry 192. Similarly, in some embodiments, all or some of RF transceiver circuitry 172 may be considered a part of interface 190. In still other embodiments, interface 190 may include one or more ports or terminals 194, radio front end circuitry 192, and RF transceiver circuitry 172, as part of a radio unit (not shown), and interface 190 may communicate with baseband processing circuitry 174, which is part of a digital unit (not shown).

Antenna 162 may include one or more antennas, or antenna arrays, configured to send and/or receive wireless signals. Antenna 162 may be coupled to radio front end circuitry 192 and may be any type of antenna capable of transmitting and receiving data and/or signals wirelessly. In some embodiments, antenna 162 may comprise one or more omni-directional, sector or panel antennas operable to transmit/receive radio signals between, for example, 2 GHz and 66 GHZ. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 162 may be separate from network node 160 and may be connectable to network node 160 through an interface or port.

Antenna 162, interface 190, and/or processing circuitry 170 may be configured to perform any receiving operations and/or certain obtaining operations described herein as being performed by a network node. Any information, data and/or signals may be received from a wireless device, another network node and/or any other network equipment. Similarly, antenna 162, interface 190, and/or processing circuitry 170 may be configured to perform any transmitting operations described herein as being performed by a network node. Any information, data and/or signals may be transmitted to a wireless device, another network node and/or any other network equipment.

Power circuitry 187 may comprise, or be coupled to, power management circuitry and is configured to supply the components of network node 160 with power for performing the functionality described herein. Power circuitry 187 may receive power from power source 186. Power source 186 and/or power circuitry 187 may be configured to provide power to the various components of network node 160 in a form suitable for the respective components (e.g., at a voltage and current level needed for each respective component). Power source 186 may either be included in, or external to, power circuitry 187 and/or network node 160. For example, network node 160 may be connectable to an external power source (e.g., an electricity outlet) via an input circuitry or interface such as an electrical cable, whereby the external power source supplies power to power circuitry 187. As a further example, power source 186 may comprise a source of power in the form of a battery or battery pack which is connected to, or integrated in, power circuitry 187. The battery may provide backup power should the external power source fail. Other types of power sources, such as photovoltaic devices, may also be used.

Alternative embodiments of network node 160 may include additional components beyond those shown in FIG. 1 that may be responsible for providing certain aspects of the network node's functionality, including any of the functionality described herein and/or any functionality necessary to support the subject matter described herein. For example, network node 160 may include user interface equipment to allow input of information into network node 160 and to allow output of information from network node 160. This may allow a user to perform diagnostic, maintenance, repair, and other administrative functions for network node 160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VOIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 110 includes antenna 111, interface 114, processing circuitry 120, device readable medium 130, user interface equipment 132, auxiliary equipment 134, power source 136 and power circuitry 137. WD 110 may include multiple sets of one or more of the illustrated components for different wireless technologies supported by WD 110, such as, for example, GSM, WCDMA, LTE, NR, WiFi, WiMAX, or Bluetooth wireless technologies, just to mention a few. These wireless technologies may be integrated into the same or different chips or set of chips as other components within WD 110.

Antenna 111 may include one or more antennas or antenna arrays, configured to send and/or receive wireless signals, and is connected to interface 114. In certain alternative embodiments, antenna 111 may be separate from WD 110 and be connectable to WD 110 through an interface or port. Antenna 111, interface 114, and/or processing circuitry 120 may be configured to perform any receiving or transmitting operations described herein as being performed by a WD. Any information, data and/or signals may be received from a network node and/or another WD. In some embodiments, radio front end circuitry and/or antenna 111 may be considered an interface.

As illustrated, interface 114 comprises radio front end circuitry 112 and antenna 111. Radio front end circuitry 112 comprise one or more filters 118 and amplifiers 116. Radio front end circuitry 112 is connected to antenna 111 and processing circuitry 120, and is configured to condition signals communicated between antenna 111 and processing circuitry 120. Radio front end circuitry 112 may be coupled to or a part of antenna 111. In some embodiments, WD 110 may not include separate radio front end circuitry 112; rather, processing circuitry 120 may comprise radio front end circuitry and may be connected to antenna 111. Similarly, in some embodiments, some or all of RF transceiver circuitry 122 may be considered a part of interface 114. Radio front end circuitry 112 may receive digital data that is to be sent out to other network nodes or WDs via a wireless connection. Radio front end circuitry 112 may convert the digital data into a radio signal having the appropriate channel and bandwidth parameters using a combination of filters 118 and/or amplifiers 116. The radio signal may then be transmitted via antenna 111. Similarly, when receiving data, antenna 111 may collect radio signals which are then converted into digital data by radio front end circuitry 112. The digital data may be passed to processing circuitry 120. In other embodiments, the interface may comprise different components and/or different combinations of components.

Processing circuitry 120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 110 components, such as device readable medium 130, WD 110 functionality. Such functionality may include providing any of the various wireless features or benefits discussed herein. For example, processing circuitry 120 may execute instructions stored in device readable medium 130 or in memory within processing circuitry 120 to provide the functionality disclosed herein.

As illustrated, processing circuitry 120 includes one or more of RF transceiver circuitry 122, baseband processing circuitry 124, and application processing circuitry 126. In other embodiments, the processing circuitry may comprise different components and/or different combinations of components. In certain embodiments processing circuitry 120 of WD 110 may comprise a SOC. In some embodiments, RF transceiver circuitry 122, baseband processing circuitry 124, and application processing circuitry 126 may be on separate chips or sets of chips. In alternative embodiments, part or all of baseband processing circuitry 124 and application processing circuitry 126 may be combined into one chip or set of chips, and RF transceiver circuitry 122 may be on a separate chip or set of chips. In still alternative embodiments, part or all of RF transceiver circuitry 122 and baseband processing circuitry 124 may be on the same chip or set of chips, and application processing circuitry 126 may be on a separate chip or set of chips. In yet other alternative embodiments, part or all of RF transceiver circuitry 122, baseband processing circuitry 124, and application processing circuitry 126 may be combined in the same chip or set of chips. In some embodiments, RF transceiver circuitry 122 may be a part of interface 114. RF transceiver circuitry 122 may condition RF signals for processing circuitry 120.

In certain embodiments, some or all of the functionality described herein as being performed by a WD may be provided by processing circuitry 120 executing instructions stored on device readable medium 130, which in certain embodiments may be a computer-readable storage medium. In alternative embodiments, some or all of the functionality may be provided by processing circuitry 120 without executing instructions stored on a separate or discrete device readable storage medium, such as in a hard-wired manner. In any of those particular embodiments, whether executing instructions stored on a device readable storage medium or not, processing circuitry 120 can be configured to perform the described functionality. The benefits provided by such functionality are not limited to processing circuitry 120 alone or to other components of WD 110, but are enjoyed by WD 110 as a whole, and/or by end users and the wireless network generally.

Processing circuitry 120 may be configured to perform any determining, calculating, or similar operations (e.g., certain obtaining operations) described herein as being performed by a WD. These operations, as performed by processing circuitry 120, may include processing information obtained by processing circuitry 120 by, for example, converting the obtained information into other information, comparing the obtained information or converted information to information stored by WD 110, and/or performing one or more operations based on the obtained information or converted information, and as a result of said processing making a determination.

Device readable medium 130 may be operable to store a computer program, software, an application including one or more of logic, rules, code, tables, etc. and/or other instructions capable of being executed by processing circuitry 120. Device readable medium 130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 120. In some embodiments, processing circuitry 120 and device readable medium 130 may be considered to be integrated.

User interface equipment 132 may provide components that allow for a human user to interact with WD 110. Such interaction may be of many forms, such as visual, audial, tactile, etc. User interface equipment 132 may be operable to produce output to the user and to allow the user to provide input to WD 110. The type of interaction may vary depending on the type of user interface equipment 132 installed in WD 110. For example, if WD 110 is a smart phone, the interaction may be via a touch screen; if WD 110 is a smart meter, the interaction may be through a screen that provides usage (e.g., the number of gallons used) or a speaker that provides an audible alert (e.g., if smoke is detected). User interface equipment 132 may include input interfaces, devices and circuits, and output interfaces, devices and circuits. User interface equipment 132 is configured to allow input of information into WD 110, and is connected to processing circuitry 120 to allow processing circuitry 120 to process the input information. User interface equipment 132 may include, for example, a microphone, a proximity or other sensor, keys/buttons, a touch display, one or more cameras, a USB port, or other input circuitry. User interface equipment 132 is also configured to allow output of information from WD 110, and to allow processing circuitry 120 to output information from WD 110. User interface equipment 132 may include, for example, a speaker, a display, vibrating circuitry, a USB port, a headphone interface, or other output circuitry. Using one or more input and output interfaces, devices, and circuits, of user interface equipment 132, WD 110 may communicate with end users and/or the wireless network, and allow them to benefit from the functionality described herein.

Auxiliary equipment 134 is operable to provide more specific functionality which may not be generally performed by WDs. This may comprise specialized sensors for doing measurements for various purposes, interfaces for additional types of communication such as wired communications etc. The inclusion and type of components of auxiliary equipment 134 may vary depending on the embodiment and/or scenario.

Power source 136 may, in some embodiments, be in the form of a battery or battery pack. Other types of power sources, such as an external power source (e.g., an electricity outlet), photovoltaic devices or power cells, may also be used. WD 110 may further comprise power circuitry 137 for delivering power from power source 136 to the various parts of WD 110 which need power from power source 136 to carry out any functionality described or indicated herein. Power circuitry 137 may in certain embodiments comprise power management circuitry. Power circuitry 137 may additionally or alternatively be operable to receive power from an external power source: in which case WD 110 may be connectable to the external power source (such as an electricity outlet) via input circuitry or an interface such as an electrical power cable. Power circuitry 137 may also in certain embodiments be operable to deliver power from an external power source to power source 136. This may be, for example, for the charging of power source 136. Power circuitry 137 may perform any formatting, converting, or other modification to the power from power source 136 to make the power suitable for the respective components of WD 110 to which power is supplied.

Figure 2:
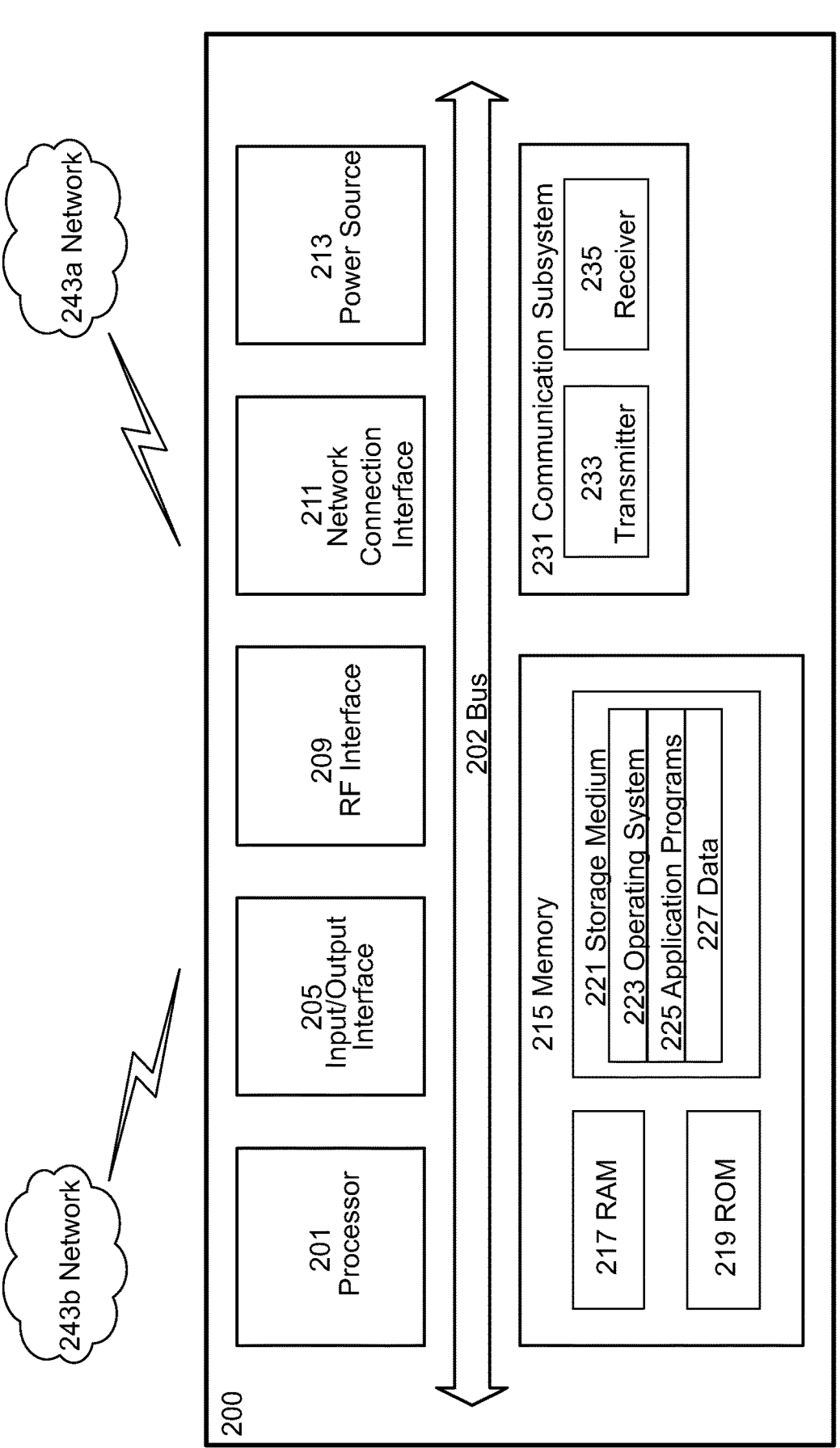
FIG. 2 illustrates an example of a User Equipment in accordance with some embodiments.

FIG. 2 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 2200 may be any UE identified by the $3^{rd}$ Generation Partnership Project (3GPP), including a NB-IoT UE, a machine type communication (MTC) UE, and/or an enhanced MTC (eMTC) UE. UE 200, as illustrated in FIG. 2, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE may be used interchangeable. Accordingly, although FIG. 2 is a UE, the components discussed herein are equally applicable to a WD, and vice-versa.

In FIG. 2, UE 200 includes processing circuitry 201 that is operatively coupled to input/output interface 205, radio frequency (RF) interface 209, network connection interface 211, memory 215 including random access memory (RAM) 217, read-only memory (ROM) 219, and storage medium 221 or the like, communication subsystem 231, power source 213, and/or any other component, or any combination thereof. Storage medium 221 includes operating system 223, application program 225, and data 227. In other embodiments, storage medium 221 may include other similar types of information. Certain UEs may utilize all of the components shown in FIG. 2, or only a subset of the components. The level of integration between the components may vary from one UE to another UE. Further, certain UEs may contain multiple instances of a component, such as multiple processors, memories, transceivers, transmitters, receivers, etc.

In FIG. 2, processing circuitry 201 may be configured to process computer instructions and data. Processing circuitry 201 may be configured to implement any sequential state machine operative to execute machine instructions stored as machine-readable computer programs in the memory, such as one or more hardware-implemented state machines (e.g., in discrete logic, FPGA, ASIC, etc.): programmable logic together with appropriate firmware: one or more stored program, general-purpose processors, such as a microprocessor or Digital Signal Processor (DSP), together with appropriate software: or any combination of the above. For example, the processing circuitry 201 may include two central processing units (CPUs). Data may be information in a form suitable for use by a computer.

In the depicted embodiment, input/output interface 205 may be configured to provide a communication interface to an input device, output device, or input and output device. UE 200 may be configured to use an output device via input/output interface 205. An output device may use the same type of interface port as an input device. For example, a USB port may be used to provide input to and output from UE 200. The output device may be a speaker, a sound card, a video card, a display, a monitor, a printer, an actuator, an emitter, a smartcard, another output device, or any combination thereof. UE 200 may be configured to use an input device via input/output interface 205 to allow a user to capture information into UE 200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 2, RF interface 209 may be configured to provide a communication interface to RF components such as a transmitter, a receiver, and an antenna. Network connection interface 211 may be configured to provide a communication interface to network 243a. Network 243a may encompass wired and/or wireless networks such as a local-area network (LAN), a wide-area network (WAN), a computer network, a wireless network, a telecommunications network, another like network or any combination thereof. For example, network 243a may comprise a Wi-Fi network. Network connection interface 211 may be configured to include a receiver and a transmitter interface used to communicate with one or more other devices over a communication network according to one or more communication protocols, such as Ethernet, TCP/IP, SONET, ATM, or the like. Network connection interface 211 may implement receiver and transmitter functionality appropriate to the communication network links (e.g., optical, electrical, and the like). The transmitter and receiver functions may share circuit components, software or firmware, or alternatively may be implemented separately.

RAM 217 may be configured to interface via bus 202 to processing circuitry 201 to provide storage or caching of data or computer instructions during the execution of software programs such as the operating system, application programs, and device drivers. ROM 219 may be configured to provide computer instructions or data to processing circuitry 201. For example, ROM 219 may be configured to store invariant low-level system code or data for basic system functions such as basic input and output (I/O), startup, or reception of keystrokes from a keyboard that are stored in a non-volatile memory. Storage medium 221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 221 may be configured to include operating system 223, application program 225 such as a web browser application, a widget or gadget engine or another application, and data file 227. Storage medium 221 may store, for use by UE 200, any of a variety of various operating systems or combinations of operating systems.

Storage medium 221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 221 may allow UE 200 to access computer-executable instructions, application programs or the like, stored on transitory or non-transitory memory media, to off-load data, or to upload data. An article of manufacture, such as one utilizing a communication system may be tangibly embodied in storage medium 221, which may comprise a device readable medium.

In FIG. 2, processing circuitry 201 may be configured to communicate with network 243*b* using communication subsystem 231. Network 243*a* and network 243*b* may be the same network or networks or different network or networks. Communication subsystem 231 may be configured to include one or more transceivers used to communicate with network 243*b*. For example, communication subsystem 231 may be configured to include one or more transceivers used to communicate with one or more remote transceivers of another device capable of wireless communication such as another WD, UE, or base station of a radio access network (RAN) according to one or more communication protocols, such as IEEE 802.2, CDMA, WCDMA, GSM, LTE, Universal Terrestrial Radio Access Network (UTRAN), WiMax, or the like. Each transceiver may include transmitter 233 and/or receiver 235 to implement transmitter or receiver functionality, respectively, appropriate to the Radio Access Network (RAN) links (e.g., frequency allocations and the like). Further, transmitter 233 and receiver 235 of each transceiver may share circuit components, software or firmware, or alternatively may be implemented separately.

In the illustrated embodiment, the communication functions of communication subsystem 231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 231 may include cellular communication, Wi-Fi communication, Bluetooth communication, and GPS communication. Network 243*b* may encompass wired and/or wireless networks such as a local-area network (LAN), a wide-area network (WAN), a computer network, a wireless network, a telecommunications network, another like network or any combination thereof. For example, network 243*b* may be a cellular network, a Wi-Fi network, and/or a near-field network. Power source 213 may be configured to provide alternating current (AC) or direct current (DC) power to components of UE 200.

The features, benefits and/or functions described herein may be implemented in one of the components of UE 200 or partitioned across multiple components of UE 200. Further, the features, benefits, and/or functions described herein may be implemented in any combination of hardware, software or firmware. In one example, communication subsystem 231 may be configured to include any of the components described herein. Further, processing circuitry 201 may be configured to communicate with any of such components over bus 202. In another example, any of such components may be represented by program instructions stored in memory that when executed by processing circuitry 201 perform the corresponding functions described herein. In another example, the functionality of any of such components may be partitioned between processing circuitry 201 and communication subsystem 231. In another example, the non-computationally intensive functions of any of such components may be implemented in software or firmware and the computationally intensive functions may be implemented in hardware.

Figure 3:
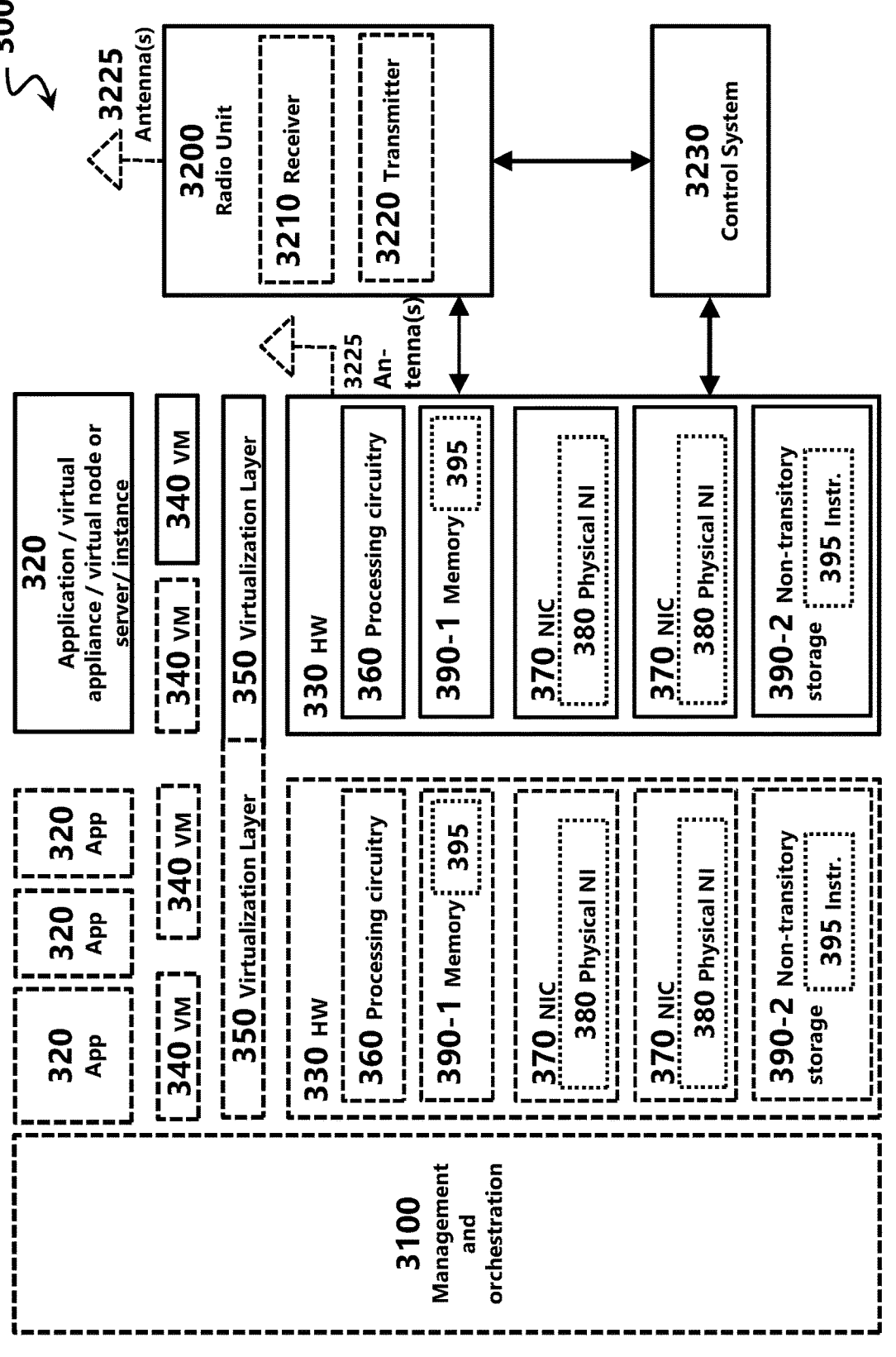
FIG. 3 illustrates an example of a virtualization environment in accordance with some embodiments.

FIG. 3 is a schematic block diagram illustrating a virtualization environment 300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 300 hosted by one or more of hardware nodes 330. Further, in embodiments in which the virtual node is not a radio access node or does not require radio connectivity (e.g., a core network node), then the network node may be entirely virtualized.

The functions may be implemented by one or more applications 320 (which may alternatively be called software instances, virtual appliances, network functions, virtual nodes, virtual network functions, etc.) operative to implement some of the features, functions, and/or benefits of some of the embodiments disclosed herein. Applications 320 are run in virtualization environment 300 which provides hardware 330 comprising processing circuitry 360 and memory 390. Memory 390 contains instructions 395 executable by processing circuitry 360 whereby application 320 is operative to provide one or more of the features, benefits, and/or functions disclosed herein.

Virtualization environment 300, comprises general-purpose or special-purpose network hardware devices 330 comprising a set of one or more processors or processing circuitry 360, which may be commercial off-the-shelf (COTS) processors, dedicated Application Specific Integrated Circuits (ASICs), or any other type of processing circuitry including digital or analog hardware components or special purpose processors. Each hardware device may comprise memory 390-1 which may be non-persistent memory for temporarily storing instructions 395 or software executed by processing circuitry 360. Each hardware device may comprise one or more network interface controllers (NICs) 370, also known as network interface cards, which include physical network interface 380. Each hardware device may also include non-transitory, persistent, machine-readable storage media 390-2 having stored therein software 395 and/or instructions executable by processing circuitry 360. Software 395 may include any type of software including software for instantiating one or more virtualization layers 350 (also referred to as hypervisors), software to execute virtual machines 340 as well as software allowing it to execute functions, features and/or benefits described in relation with some embodiments described herein.

Virtual machines 340, comprise virtual processing, virtual memory, virtual networking or interface and virtual storage, and may be run by a corresponding virtualization layer 350 or hypervisor. Different embodiments of the instance of virtual appliance 320 may be implemented on one or more of virtual machines 340, and the implementations may be made in different ways.

During operation, processing circuitry 360 executes software 395 to instantiate the hypervisor or virtualization layer 350, which may sometimes be referred to as a virtual machine monitor (VMM). Virtualization layer 350 may present a virtual operating platform that appears like networking hardware to virtual machine 340.

As shown in FIG. 3, hardware 330 may be a standalone network node with generic or specific components. Hardware 330 may comprise antenna 3225 and may implement some functions via virtualization. Alternatively, hardware 330 may be part of a larger cluster of hardware (e.g. such as in a data center or customer premise equipment (CPE)) where many hardware nodes work together and are managed via management and orchestration (MANO) 3100, which, among others, oversees lifecycle management of applications 320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 340 may be a software implementation of a physical machine that runs programs as if they were executing on a physical, non-virtualized machine. Each of virtual machines 340, and that part of hardware 330 that executes that virtual machine, be it hardware dedicated to that virtual machine and/or hardware shared by that virtual machine with others of the virtual machines 340, forms a separate virtual network elements (VNE).

Still in the context of NFV, Virtual Network Function (VNF) is responsible for handling specific network functions that run in one or more virtual machines 340 on top of hardware networking infrastructure 330 and corresponds to application 320 in FIG. 3.

In some embodiments, one or more radio units 3200 that each include one or more transmitters 3220 and one or more receivers 3210 may be coupled to one or more antennas 3225. Radio units 3200 may communicate directly with hardware nodes 330 via one or more appropriate network interfaces and may be used in combination with the virtual components to provide a virtual node with radio capabilities, such as a radio access node or a base station.

In some embodiments, some signalling can be effected with the use of control system 3230 which may alternatively be used for communication between the hardware nodes 330 and radio units 3200.

Figure 4:
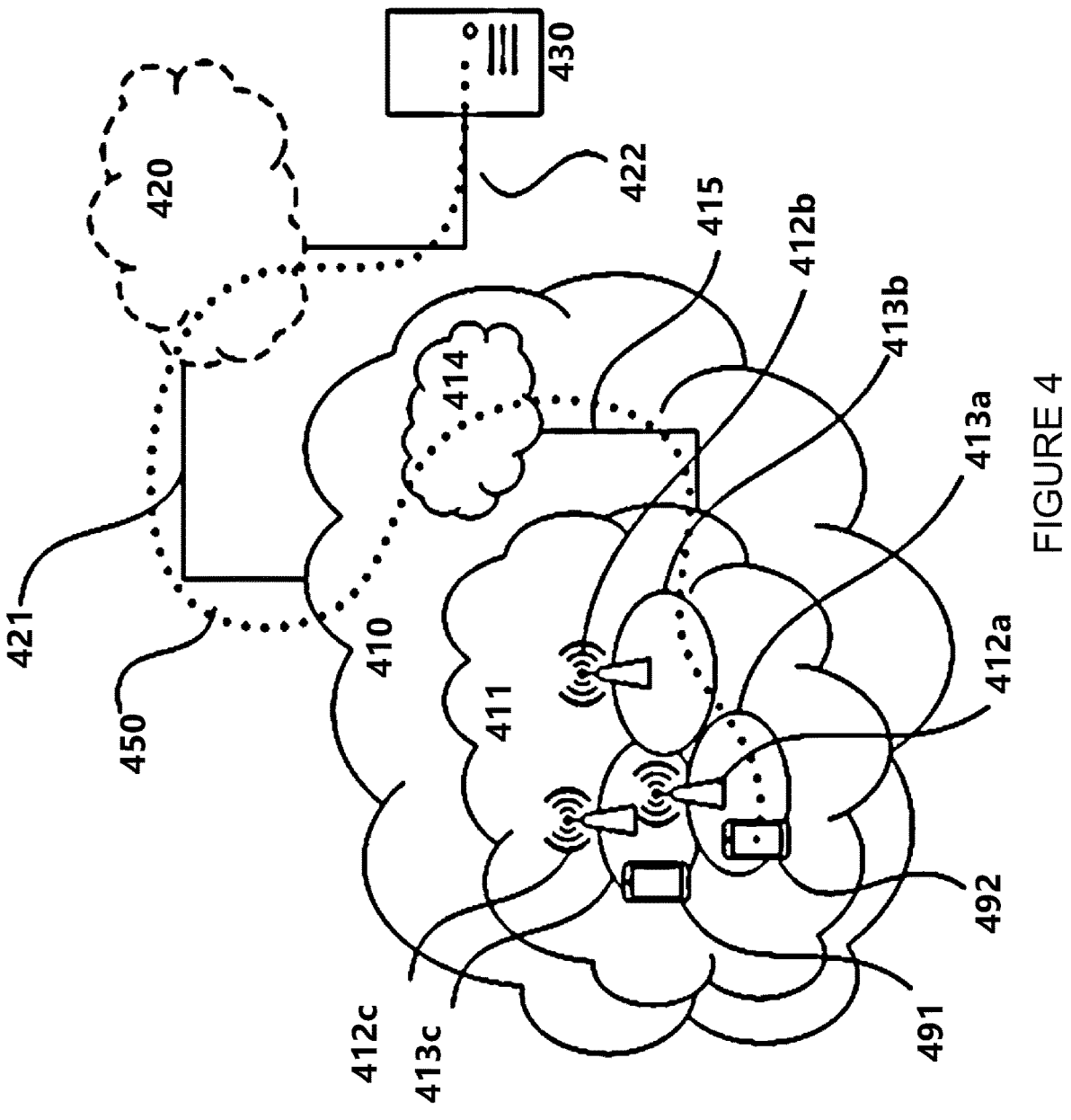
FIG. 4 illustrates an example of a telecommunication network connected via an intermediate network to a host computer in accordance with some embodiments.

With reference to FIG. 4, in accordance with an embodiment, a communication system includes telecommunication network 410, such as a 3GPP-type cellular network, which comprises access network 411, such as a radio access network, and core network 414. Access network 411 comprises a plurality of base stations 412a, 412b, 412c, such as NBs, eNBs, gNBs or other types of wireless access points, each defining a corresponding coverage area 413a, 413b, 413c. Each base station 412a, 412b, 412c is connectable to core network 414 over a wired or wireless connection 415.

A first UE 491 located in coverage area 413c is configured to wirelessly connect to, or be paged by, the corresponding base station 412c. A second UE 492 in coverage area 413a is wirelessly connectable to the corresponding base station 412a. While a plurality of UEs 491, 492 are illustrated in this example, the disclosed embodiments are equally applicable to a situation where a sole UE is in the coverage area or where a sole UE is connecting to the corresponding base station 412.

Telecommunication network 410 is itself connected to host computer 430, which may be embodied in the hardware and/or software of a standalone server, a cloud-implemented server, a distributed server or as processing resources in a server farm. Host computer 430 may be under the ownership or control of a service provider, or may be operated by the service provider or on behalf of the service provider. Connections 421 and 422 between telecommunication network 410 and host computer 430 may extend directly from core network 414 to host computer 430 or may go via an optional intermediate network 420. Intermediate network 420 may be one of, or a combination of more than one of, a public, private or hosted network: intermediate network 420, if any, may be a backbone network or the Internet: in particular, intermediate network 420 may comprise two or more sub-networks (not shown).

The communication system of FIG. 4 as a whole enables connectivity between the connected UEs 491, 492 and host computer 430. The connectivity may be described as an over-the-top (OTT) connection 450. Host computer 430 and the connected UEs 491, 492 are configured to communicate data and/or signaling via OTT connection 450, using access network 411, core network 414, any intermediate network 420 and possible further infrastructure (not shown) as intermediaries. OTT connection 450 may be transparent in the sense that the participating communication devices through which OTT connection 450 passes are unaware of routing of uplink (UL) and downlink communications. For example, base station 412 may not or need not be informed about the past routing of an incoming downlink communication with data originating from host computer 430 to be forwarded (e.g., handed over) to a connected UE 491. Similarly, base station 412 need not be aware of the future routing of an outgoing uplink communication originating from the UE 491 towards the host computer 430.

Example implementations, in accordance with an embodiment, of the UE, base station and host computer discussed in the preceding paragraphs will now be described with reference to FIG. 5. In communication system 500, host computer 510 comprises hardware 515 including communication interface 516 configured to set up and maintain a wired or wireless connection with an interface of a different communication device of communication system 500. Host computer 510 further comprises processing circuitry 518, which may have storage and/or processing capabilities. In particular, processing circuitry 518 may comprise one or more programmable processors, application-specific integrated circuits, field programmable gate arrays or combinations of these (not shown) adapted to execute instructions. Host computer 510 further comprises software 511, which is stored in or accessible by host computer 510 and executable by processing circuitry 518. Software 511 includes host application 512. Host application 512 may be operable to provide a service to a remote user, such as UE 530 connecting via OTT connection 550 terminating at UE 530 and host computer 510. In providing the service to the remote user, host application 512 may provide user data which is transmitted using OTT connection 550.

Communication system 500 further includes base station 520 provided in a telecommunication system and comprising hardware 525 enabling it to communicate with host computer 510 and with UE 530. Hardware 525 may include communication interface 526 for setting up and maintaining a wired or wireless connection with an interface of a different communication device of communication system 500, as well as radio interface 527 for setting up and maintaining at least wireless connection 570 with UE 530 located in a coverage area (not shown in FIG. 5) served by base station 520. Communication interface 526 may be configured to facilitate connection 560 to host computer 510. Connection 560 may be direct or it may pass through a core network (not shown in FIG. 5) of the telecommunication system and/or through one or more intermediate networks outside the telecommunication system. In the embodiment shown, hardware 525 of base station 520 further includes processing circuitry 528, which may comprise one or more programmable processors, application-specific integrated circuits, field programmable gate arrays or combinations of these (not shown) adapted to execute instructions. Base station 520 further has software 521 stored internally or accessible via an external connection.

Communication system 500 further includes UE 530 already referred to. Its hardware 535 may include radio interface 537 configured to set up and maintain wireless connection 570 with a base station serving a coverage area in which UE 530 is currently located. Hardware 535 of UE 530 further includes processing circuitry 538, which may comprise one or more programmable processors, application-specific integrated circuits, field programmable gate arrays or combinations of these (not shown) adapted to execute instructions. UE 530 further comprises software 531, which is stored in or accessible by UE 530 and executable by processing circuitry 538. Software 531 includes client application 532. Client application 532 may be operable to provide a service to a human or non-human user via UE 530, with the support of host computer 510. In host computer 510, an executing host application 512 may communicate with the executing client application 532 via OTT connection 550 terminating at UE 530 and host computer 510. In providing the service to the user, client application 532 may receive request data from host application 512 and provide user data in response to the request data. OTT connection 550 may transfer both the request data and the user data. Client application 532 may interact with the user to generate the user data that it provides.

Figure 5:
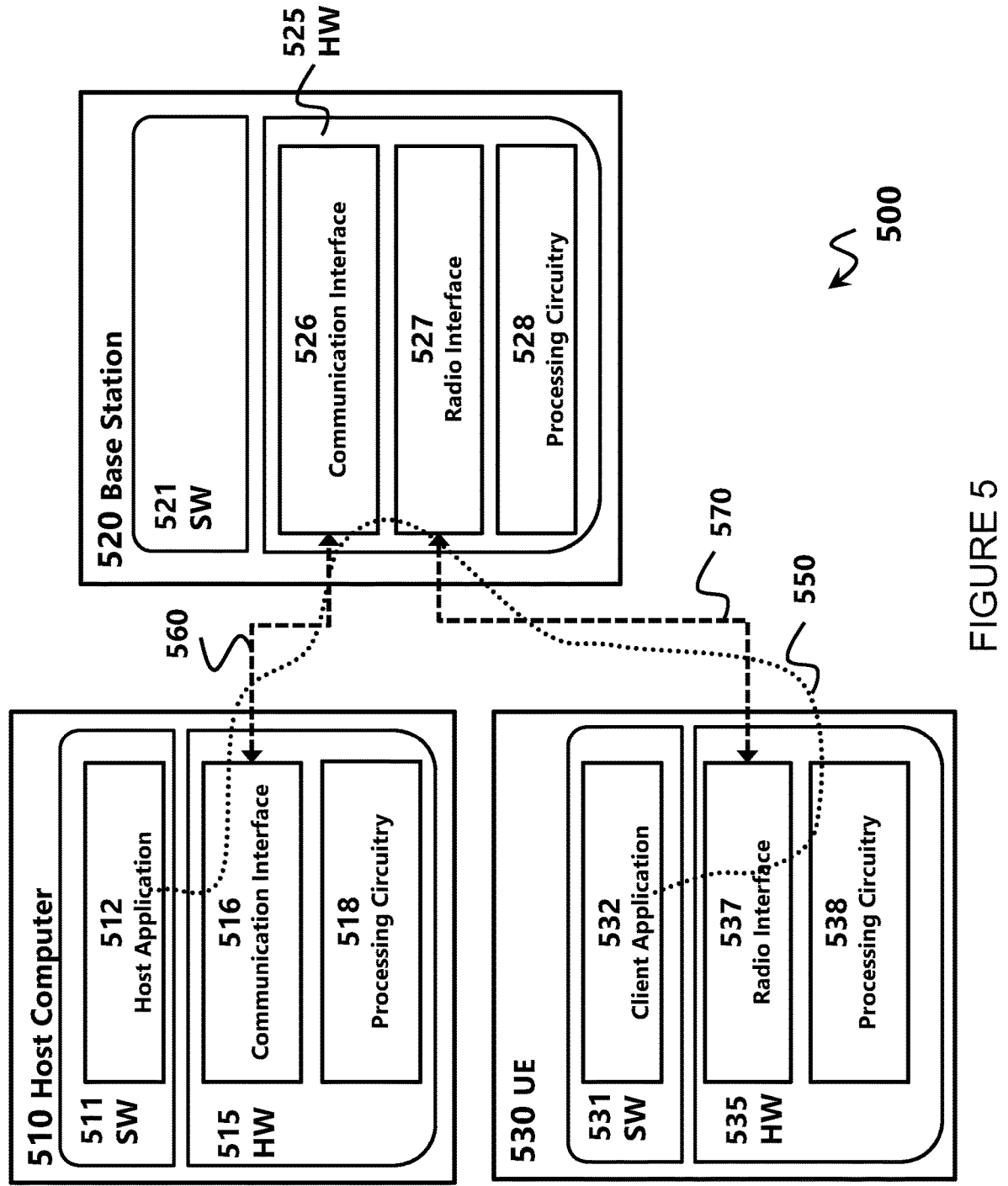
FIG. 5 illustrates an example of a host computer communicating via a base station with a user equipment over a partially wireless connection in accordance with some embodiments.

It is noted that host computer 510, base station 520 and UE 530 illustrated in FIG. 5 may be similar or identical to host computer 430, one of base stations 412a, 412b, 412c and one of UEs 491, 492 of FIG. 4, respectively. This is to say, the inner workings of these entities may be as shown in FIG. 5 and independently, the surrounding network topology may be that of FIG. 4.

In FIG. 5, OTT connection 550 has been drawn abstractly to illustrate the communication between host computer 510 and UE 530 via base station 520, without explicit reference to any intermediary devices and the precise routing of messages via these devices. Network infrastructure may determine the routing, which it may be configured to hide from UE 530 or from the service provider operating host computer 510, or both. While OTT connection 550 is active, the network infrastructure may further take decisions by which it dynamically changes the routing (e.g., on the basis of load balancing consideration or reconfiguration of the network).

Wireless connection 570 between UE 530 and base station 520 is in accordance with the teachings of the embodiments described throughout this disclosure. One or more of the various embodiments improve the performance of OTT services provided to UE 530 using OTT connection 550, in which wireless connection 570 forms the last segment. More precisely, the teachings of these embodiments may improve the power consumption and thereby provide benefits such as extended battery lifetime.

A measurement procedure may be provided for the purpose of monitoring data rate, latency and other factors on which the one or more embodiments improve. There may further be an optional network functionality for reconfiguring OTT connection 550 between host computer 510 and UE 530, in response to variations in the measurement results. The measurement procedure and/or the network functionality for reconfiguring OTT connection 550 may be implemented in software 511 and hardware 515 of host computer 510 or in software 531 and hardware 535 of UE 530, or both. In embodiments, sensors (not shown) may be deployed in or in association with communication devices through which OTT connection 550 passes: the sensors may participate in the measurement procedure by supplying values of the monitored quantities exemplified above, or supplying values of other physical quantities from which software 511, 531 may compute or estimate the monitored quantities. The reconfiguring of OTT connection 550 may include message format, retransmission settings, preferred routing etc.: the reconfiguring need not affect base station 520, and it may be unknown or imperceptible to base station 520. Such procedures and functionalities may be known and practiced in the art. In certain embodiments, measurements may involve proprietary UE signaling facilitating host computer 510's measurements of throughput, propagation times, latency and the like. The measurements may be implemented in that software 511 and 531 causes messages to be transmitted, in particular empty or 'dummy' messages, using OTT connection 550 while it monitors propagation times, errors etc.

Figures 6, 7:
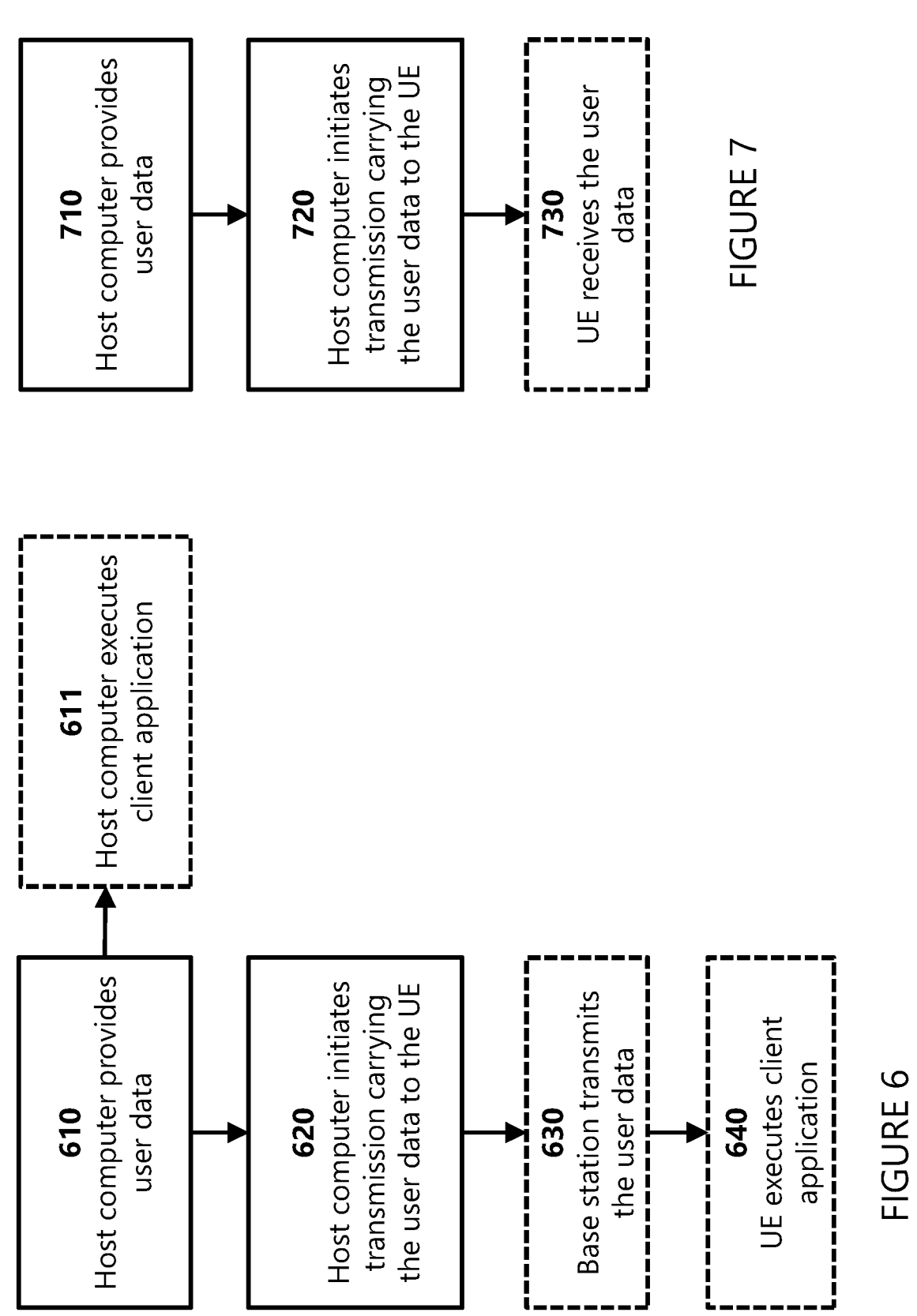
FIG. 6 illustrates examples of methods implemented in a communication system including a host computer, a base station and a user equipment in accordance with some embodiments.
FIG. 7 illustrates examples of methods implemented in a communication system including a host computer, a base station and a user equipment in accordance with some embodiments.

FIG. 6 is a flowchart illustrating a method implemented in a communication system, in accordance with one embodiment. The communication system includes a host computer, a base station and a UE which may be those described with reference to FIGS. 4 and 5. For simplicity of the present disclosure, only drawing references to FIG. 6 will be included in this section. In step 610, the host computer provides user data. In substep 611 (which may be optional) of step 610, the host computer provides the user data by executing a host application. In step 620, the host computer initiates a transmission carrying the user data to the UE. In step 630 (which may be optional), the base station transmits to the UE the user data which was carried in the transmission that the host computer initiated, in accordance with the teachings of the embodiments described throughout this disclosure. In step 640 (which may also be optional), the UE executes a client application associated with the host application executed by the host computer.

FIG. 7 is a flowchart illustrating a method implemented in a communication system, in accordance with one embodiment. The communication system includes a host computer, a base station and a UE which may be those described with reference to FIGS. 4 and 5. For simplicity of the present disclosure, only drawing references to FIG. 7 will be included in this section. In step 710 of the method, the host computer provides user data. In an optional substep (not shown) the host computer provides the user data by executing a host application. In step 720, the host computer initiates a transmission carrying the user data to the UE. The transmission may pass via the base station, in accordance with the teachings of the embodiments described throughout this disclosure. In step 730 (which may be optional), the UE receives the user data carried in the transmission.

FIG. 8 is a flowchart illustrating a method implemented in a communication system, in accordance with one embodiment. The communication system includes a host computer, a base station and a UE which may be those described with reference to FIGS. 4 and 5. For simplicity of the present disclosure, only drawing references to FIG. 8 will be included in this section. In step 810 (which may be optional), the UE receives input data provided by the host computer. Additionally or alternatively, in step 820, the UE provides user data. In substep 821 (which may be optional) of step 820, the UE provides the user data by executing a client application. In substep 811 (which may be optional) of step 810, the UE executes a client application which provides the user data in reaction to the received input data provided by the host computer. In providing the user data, the executed client application may further consider user input received from the user. Regardless of the specific manner in which the user data was provided, the UE initiates, in substep 830 (which may be optional), transmission of the user data to the host computer. In step 840 of the method, the host computer receives the user data transmitted from the UE, in accordance with the teachings of the embodiments described throughout this disclosure.

FIG. 9 is a flowchart illustrating a method implemented in a communication system, in accordance with one embodiment. The communication system includes a host computer, a base station and a UE which may be those described with reference to FIGS. 4 and 5. For simplicity of the present disclosure, only drawing references to FIG. 9 will be included in this section. In step 910 (which may be optional), in accordance with the teachings of the embodiments described throughout this disclosure, the base station receives user data from the UE. In step 920 (which may be optional), the base station initiates transmission of the received user data to the host computer. In step 930 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

FIG. 10 depicts a method in accordance with particular embodiments. The method may be performed by a wireless device, such as wireless device 110 (e.g., UE 200) described above. The method begins at step 1002 with receiving, from a network node, signaling indicating a quasi-co location (QCL) relation parameter. The signaling indicating the QCL relation parameter comprises one or more available bits in one or more of a controlReserousetSetZero field, a searchSpaceZero field, and/or a subCarrierSpacingCommon field. The method proceeds to step 1004 with using the QCL relation parameter when performing an operation of the wireless device.

Figure 11:
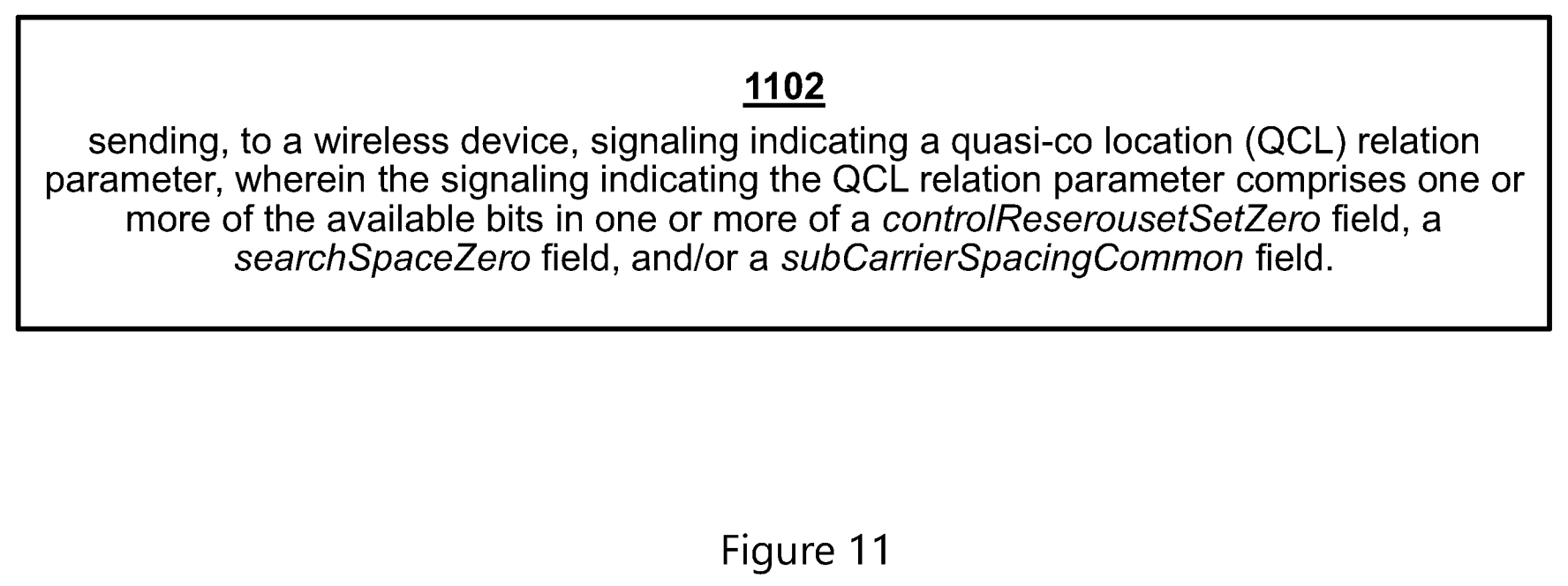

FIG. 11 depicts a method in accordance with particular embodiments. The method may be performed by a network node, such as network node 160 described above. The method comprises sending, to a wireless device, signaling indicating a quasi-co location (QCL) relation parameter (step 1102). The signaling indicating the QCL relation parameter comprises one or more of the available bits in one or more of a controlReserousetSetZero field, a searchSpaceZero field, and/or a subCarrierSpacingCommon field.

Figure 12:
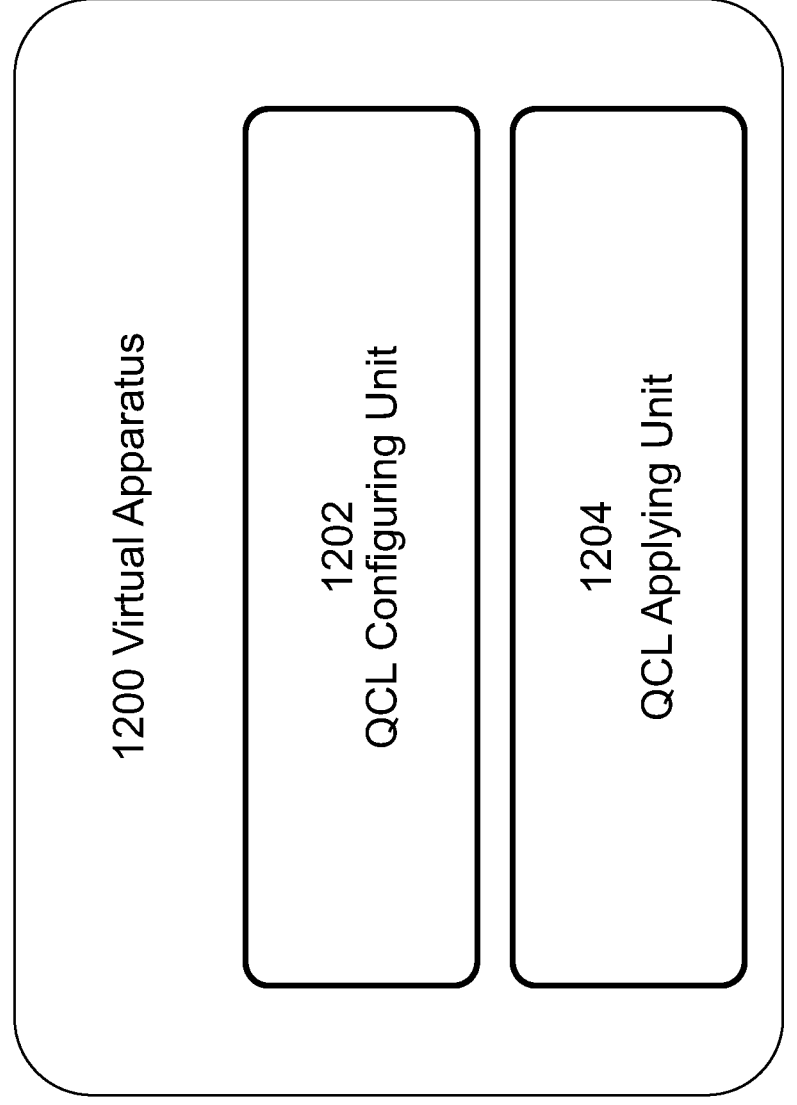
FIG. 12 illustrates an example virtualization apparatus in accordance with some embodiments.

FIG. 12 illustrates a schematic block diagram of an apparatus 1200 in a wireless network (for example, the wireless network shown in FIG. 1). The apparatus may be implemented in a wireless device or network node (e.g., wireless device 110 or network node 160 shown in FIG. 1). Apparatus 1200 is operable to carry out the example method described with reference to FIG. 10 or 11 and possibly any other processes or methods disclosed herein. It is also to be understood that the method of FIG. 10 or 11 is not necessarily carried out solely by apparatus 1200. At least some operations of the method can be performed by one or more other entities.

Virtual Apparatus 1200 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause QCL configuring unit 1202, QCL applying unit 1204, and any other suitable units of apparatus 1200 to perform corresponding functions according one or more embodiments of the present disclosure. As illustrated in FIG. 11, apparatus 1200 includes QCL configuring unit 1202 and QCL applying unit 1204. In general, QCL configuring unit 1202 is adapted to configure a QCL relation parameter. As an example, in the case where apparatus 1200 is used to implement a wireless device 110, QCL configuring unit 1202 may determine the QCL relation parameter based on signalling received from a network node 160 and may configure the wireless device 110 with the QCL relation parameter. As another example, in the case where apparatus 1200 is used to implement a network node 160, QCL configuring unit 1202 may determine the QCL relation parameter and may indicate the QCL relation parameter in signalling to a wireless device 110. In general, QCL applying unit 1204 is adapted to use the QCL relation parameter, for example, in order to perform an operation associated with QCL.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

In some embodiments a computer program, computer program product or computer readable storage medium comprises instructions which when executed on a computer perform any of the embodiments disclosed herein. In further examples the instructions are carried on a signal or carrier and which are executable on a computer wherein when executed perform any of the embodiments disclosed herein.

Embodiments

Group A Embodiments

1. A method performed by a wireless device, the method comprising:
    receiving, from a network node, signaling indicating a quasi-co location (QCL) relation parameter; and
    using the QCL relation parameter when performing an operation of the wireless device.

2. The method of example embodiment 1, wherein the signaling indicating the QCL relation parameter comprises a most significant bit of a controlResourceSetZero field.

3. The method of any of example embodiments 1-2, wherein the signaling indicating the QCL relation parameter comprises up to three most significant bits from a searchSpaceZero field.

4. The method of any of example embodiments 1-3, wherein the signaling indicating the QCL relation parameter comprises a controlResourceSetZero field and a searchSpaceZero field, and wherein the method further comprises:
    determining, based on the controlResourceSetZero field, that multiplexing pattern 2 or 3 is used; and
    in response to determining that multiplexing pattern 2 or 3 is used, determining the QCL relation parameter based on the controlResourceSetZero field and the searchSpaceZero field.

5. The method of any of example embodiments 1-3, wherein the signaling indicating the QCL relation parameter comprises a controlResourceSetZero field and a searchSpaceZero field, and wherein the method further comprises:
    determining, based on the controlResourceSetZero field, that multiplexing pattern 1 is used; and
    in response to determining that multiplexing pattern 1 is used, determining the QCL relation parameter based on the controlResourceSetZero field and based on assuming that bits in the searchSpaceZero field associated with signaling the QCL relation parameter are set to zero.

6. The method of any of example embodiments 1-5, wherein the signaling indicating the QCL relation parameter comprises a subCarrierSpacingCommon field when subcarrier spacing is the same for a synchronization signal block (SSB) and an initial downlink bandwidth part.

7. The method of example embodiment 6, wherein the signaling indicating the QCL relation parameter further comprises a controlResourceSetZero field.

8. The method of any of example embodiments 1-7, further comprising:
    determining that the ControlResourceSetZero field and/or the searchSpaceZero field indicate the QCL relation parameter based on determining that no CORESET for Type0-PDCCH CSS set is present.

9. The method of any of example embodiments 1-8, wherein the signaling indicating the QCL relation parameter comprises one or more available bits in one or more of a controlReserousetSetZero field, a searchSpaceZero field, and/or a subCarrierSpacingCommon field.

10. The method of any of example embodiments 1-9, wherein the signaling indicating the QCL relation parameter further comprises at least one MIB bit.

11. The method of any of example embodiments 1-10, wherein the signaling indicates the QCL relation parameter in a way other than by using one least significant bit from ssb-SubcarrierOffset in combination with a subCarrierSpacingCommon field in master information block (MIB) signalling.

12. The method of any of example embodiments 1-11, wherein the signaling indicates the QCL relation parameter in a way other than according to 3GPP NR Release 16.

13. The method of any of example embodiments 1-12, wherein the QCL relation parameter is associated with Frequency Range 2 (FR2).

14. The method of example embodiment 13, further comprising:
    receiving, from the network node, signaling indicating a QCL relation parameter associated with Frequency Range 1 (FR1).

15. The method of example embodiment 14, wherein the QCL relation parameter associated with FR1 is received via MIB signalling using one least significant bit from ssb-SubcarrierOffset and a subCarrierSpacingCommon field.

16. The method of example embodiment 14 or 15, wherein the QCL relation parameter associated with FR1 is received according to 3GPP NR Release 16.

17. The method of any of example embodiments 1-16, wherein the operation of the wireless device comprises assuming that synchronization signal (SS) or physical broadcast channel (PBCH) blocks transmitted with a same block index on a same center frequency location are quasi co-located with respect to one or more of: Doppler spread, Doppler shift, average gain, average delay, delay spread, and/or spatial receive (Rx) parameters.

18. The method of any of example embodiments 1-17, further comprising:
    interpreting the signaling based on one or more rules for determining which one or more bits of one or more fields is being used to indicate the QCL relation parameter.

19. The method of any of the previous embodiments, further comprising:
    providing user data; and
    forwarding the user data to a host computer via the transmission to the base station.

Group B Embodiments

20. A method performed by a network node, the method comprising:
    sending, to a wireless device, signaling indicating a quasi-co location (QCL) relation parameter.

21. The method of example embodiment 20, wherein the signaling indicating the QCL relation parameter comprises a most significant bit of a controlResourceSetZero field.

22. The method of any of example embodiments 20-21, wherein the signaling indicating the QCL relation parameter comprises up to three most significant bits from a searchSpaceZero field.

23. The method of any of example embodiments 20-22, wherein the signaling indicating the QCL relation parameter comprises a controlResourceSetZero field and a searchSpaceZero field, and wherein the method further comprises:

using the controlResourceSetZero field to indicate that multiplexing pattern 2 or 3 is used such that the wireless device is to determine the QCL relation parameter based on the controlResourceSetZero field and the searchSpaceZero field.

24. The method of any of example embodiments 20-22, wherein the signaling indicating the QCL relation parameter comprises a controlResourceSetZero field and a searchSpaceZero field, and wherein the method further comprises:

using the controlResourceSetZero field to indicate that multiplexing pattern 1 is used such that the wireless device is to determine the QCL relation parameter based on the controlResourceSetZero field and based on assuming that bits in the searchSpaceZero field associated with signaling the QCL relation parameter are set to zero.

25. The method of any of example embodiments 20-24, wherein the signaling indicating the QCL relation parameter comprises a subCarrierSpacingCommon field when subcarrier spacing is the same for a synchronization signal block (SSB) and an initial downlink bandwidth part.

26. The method of example embodiment 25, wherein the signaling indicating the QCL relation parameter further comprises a controlResourceSetZero field.

27. The method of any of example embodiments 20-26, further comprising:

determining to use the ControlResourceSetZero field and/or the searchSpaceZero field to indicate the QCL relation parameter based on no CORESET for Type0-PDCCH CSS set being present.

28. The method of any of example embodiments 20-27, wherein the signaling indicating the QCL relation parameter comprises one or more available bits in one or more of a controlReserousetSetZero field, a searchSpaceZero field, and/or a subCarrierSpacingCommon field.

29. The method of any of example embodiments 20-28, wherein the signaling indicating the QCL relation parameter further comprises at least one MIB bit.

30. The method of any of example embodiments 20-29, wherein the signaling indicates the QCL relation parameter in a way other than by using one least significant bit from ssb-SubcarrierOffset in combination with a subCarrierSpacingCommon field in master information block (MIB) signalling.

31. The method of any of example embodiments 20-30, wherein the signaling indicates the QCL relation parameter in a way other than according to 3GPP NR Release 16.

32. The method of any of example embodiments 20-31, wherein the QCL relation parameter is associated with Frequency Range 2 (FR2).

33. The method of example embodiment 32, further comprising:

sending the wireless device signaling indicating a QCL relation parameter associated with Frequency Range 1 (FR1).

34. The method of example embodiment 33, wherein the QCL relation parameter associated with FR1 is indicated via MIB signalling using one least significant bit from ssb-SubcarrierOffset and a subCarrierSpacingCommon field.

35. The method of example embodiment 33 or 34, wherein the QCL relation parameter associated with FR1 is indicated according to 3GPP NR Release 16.

36. The method of any of example embodiments 20-35, further comprising, prior to sending the signaling indicating the QCL relation parameter:

determining the QCL relation parameter; and
    preparing the signaling to be sent in order to indicate the QCL relation parameter.

37. The method of example embodiment 36, wherein preparing the signaling comprises applying one or more rules for determining one or more bits of one or more fields to be used to indicate the QCL relation parameter.

38. The method of any of the previous embodiments, further comprising:

obtaining user data; and
    forwarding the user data to a host computer or a wireless device.

Group C Embodiments

39. A wireless device, the wireless device comprising:

processing circuitry configured to perform any of the steps of any of the Group A embodiments; and
    power supply circuitry configured to supply power to the wireless device.

40. A base station, the base station comprising:

processing circuitry configured to perform any of the steps of any of the Group B embodiments;
    power supply circuitry configured to supply power to the base station.

41. A user equipment (UE), the UE comprising:

an antenna configured to send and receive wireless signals;
    radio front-end circuitry connected to the antenna and to processing circuitry, and configured to condition signals communicated between the antenna and the processing circuitry;
    the processing circuitry being configured to perform any of the steps of any of the Group A embodiments;
    an input interface connected to the processing circuitry and configured to allow input of information into the UE to be processed by the processing circuitry;
    an output interface connected to the processing circuitry and configured to output information from the UE that has been processed by the processing circuitry; and
    a battery connected to the processing circuitry and configured to supply power to the UE.

42. A computer program, the computer program comprising instructions which when executed on a computer perform any of the steps of any of the Group A embodiments.

43. A computer program product comprising a computer program, the computer program comprising instructions which when executed on a computer perform any of the steps of any of the Group A embodiments.

44. A non-transitory computer-readable storage medium or carrier comprising a computer program, the computer program comprising instructions which when executed on a computer perform any of the steps of any of the Group A embodiments.

45. A computer program, the computer program comprising instructions which when executed on a computer perform any of the steps of any of the Group B embodiments.

46. A computer program product comprising a computer program, the computer program comprising instructions which when executed on a computer perform any of the steps of any of the Group B embodiments.

47. A non-transitory computer-readable storage medium or carrier comprising a computer program, the computer program comprising instructions which when executed on a computer perform any of the steps of any of the Group B embodiments.

48. A communication system including a host computer comprising:

processing circuitry configured to provide user data; and a communication interface configured to forward the user data to a cellular network for transmission to a user equipment (UE), wherein the cellular network comprises a base station having a radio interface and processing circuitry, the base station's processing circuitry configured to perform any of the steps of any of the Group B embodiments.

49. The communication system of the pervious embodiment further including the base station.

50. The communication system of the previous 2 embodiments, further including the UE, wherein the UE is configured to communicate with the base station.

51. The communication system of the previous 3 embodiments, wherein:

the processing circuitry of the host computer is configured to execute a host application, thereby providing the user data; and the UE comprises processing circuitry configured to execute a client application associated with the host application.

52. A method implemented in a communication system including a host computer, a base station and a user equipment (UE), the method comprising:

at the host computer, providing user data; and at the host computer, initiating a transmission carrying the user data to the UE via a cellular network comprising the base station, wherein the base station performs any of the steps of any of the Group B embodiments.

53. The method of the previous embodiment, further comprising, at the base station, transmitting the user data.

54. The method of the previous 2 embodiments, wherein the user data is provided at the host computer by executing a host application, the method further comprising, at the UE, executing a client application associated with the host application.

55. A user equipment (UE) configured to communicate with a base station, the UE comprising a radio interface and processing circuitry configured to performs the of the previous 3 embodiments.

56. A communication system including a host computer comprising:

processing circuitry configured to provide user data; and a communication interface configured to forward user data to a cellular network for transmission to a user equipment (UE), wherein the UE comprises a radio interface and processing circuitry, the UE's components configured to perform any of the steps of any of the Group A embodiments.

57. The communication system of the previous embodiment, wherein the cellular network further includes a base station configured to communicate with the UE.

58. The communication system of the previous 2 embodiments, wherein:

the processing circuitry of the host computer is configured to execute a host application, thereby providing the user data; and the UE's processing circuitry is configured to execute a client application associated with the host application.

59. A method implemented in a communication system including a host computer, a base station and a user equipment (UE), the method comprising:

at the host computer, providing user data; and at the host computer, initiating a transmission carrying the user data to the UE via a cellular network comprising the base station, wherein the UE performs any of the steps of any of the Group A embodiments.

60. The method of the previous embodiment, further comprising at the UE, receiving the user data from the base station.

61. A communication system including a host computer comprising:

communication interface configured to receive user data originating from a transmission from a user equipment (UE) to a base station, wherein the UE comprises a radio interface and processing circuitry, the UE's processing circuitry configured to perform any of the steps of any of the Group A embodiments.

62. The communication system of the previous embodiment, further including the UE.

63. The communication system of the previous 2 embodiments, further including the base station, wherein the base station comprises a radio interface configured to communicate with the UE and a communication interface configured to forward to the host computer the user data carried by a transmission from the UE to the base station.

64. The communication system of the previous 3 embodiments, wherein:

the processing circuitry of the host computer is configured to execute a host application; and the UE's processing circuitry is configured to execute a client application associated with the host application, thereby providing the user data.

65. The communication system of the previous 4 embodiments, wherein:

the processing circuitry of the host computer is configured to execute a host application, thereby providing request data; and the UE's processing circuitry is configured to execute a client application associated with the host application, thereby providing the user data in response to the request data.

66. A method implemented in a communication system including a host computer, a base station and a user equipment (UE), the method comprising:

at the host computer, receiving user data transmitted to the base station from the UE, wherein the UE performs any of the steps of any of the Group A embodiments.

67. The method of the previous embodiment, further comprising, at the UE, providing the user data to the base station.

68. The method of the previous 2 embodiments, further comprising:

at the UE, executing a client application, thereby providing the user data to be transmitted; and at the host computer, executing a host application associated with the client application.

69. The method of the previous 3 embodiments, further comprising:

at the UE, executing a client application; and at the UE, receiving input data to the client application, the input data being provided at the host computer by executing a host application associated with the client application, wherein the user data to be transmitted is provided by the client application in response to the input data.

70. A communication system including a host computer comprising a communication interface configured to receive user data originating from a transmission from a user equipment (UE) to a base station, wherein the base station comprises a radio interface and processing circuitry, the base station's processing circuitry configured to perform any of the steps of any of the Group B embodiments.

71. The communication system of the previous embodiment further including the base station.

72. The communication system of the previous 2 embodiments, further including the UE, wherein the UE is configured to communicate with the base station.

73. The communication system of the previous 3 embodiments, wherein:

the processing circuitry of the host computer is configured to execute a host application;

the UE is configured to execute a client application associated with the host application, thereby providing the user data to be received by the host computer.

74. A method implemented in a communication system including a host computer, a base station and a user equipment (UE), the method comprising:

at the host computer, receiving, from the base station, user data originating from a transmission which the base station has received from the UE, wherein the UE performs any of the steps of any of the Group A embodiments.

75. The method of the previous embodiment, further comprising at the base station, receiving the user data from the UE.

76. The method of the previous 2 embodiments, further comprising at the base station, initiating a transmission of the received user data to the host computer.

FIG. 13 illustrates an example of a method performed by a wireless device in accordance with certain embodiments. In an embodiment, the method of FIG. 13 may be performed by a wireless device 110. For example, wireless device 110 may comprise processing circuitry 120 configured to perform the steps of the method. In an embodiment, the processing circuitry 120 may execute instructions of a computer program that cause wireless device 110 to perform the method. In an embodiment, the wireless device that performs the method of FIG. 13 may be a user equipment 200. For example, user equipment 200 may comprise processing circuitry 201 configured to perform the steps of the method. In an embodiment, the processing circuitry 201 may execute instructions of a computer program that cause user equipment 200 to perform the method. In certain embodiments, the wireless device operates in unlicensed spectrum with respect to at least FR2.

The method of FIG. 13 begins at step 1302 with determining a QCL relation parameter associated with FR2. The QCL relation parameter associated with FR2 is determined based on a subCarrierSpacingCommon field of a master information block for FR2 received in signaling from a network node. As an example, certain embodiments determine the QCL relation parameter associated with FR2 using the subCarrierSpacingCommon field for FR2 without using any other field received in the signaling from the network node. In certain embodiments, the QCL relation parameter associated with FR2 is determined based on a single bit received from the network node, the single bit received in the subCarrierSpacingCommon for FR2. The subCarrierSpacingCommon field for FR2 may be a one-bit field configured to indicate either a first value or a second value of the QCL relation parameter associated with FR2. For example, as discussed above (e.g., "Embodiment #3), in case the SSB and initial downlink bandwidth part sub-carrier spacing is the same, the one-bit-field subCarrierSpacingCommon becomes redundant and can be used to signal two values of

$$N_{SSB}^{QCL}.$$

In one non-limiting example, the values are 32 and 64.

Thus, in certain embodiments, the subCarrierSpacingCommon field for FR2 indicates the QCL relation parameter associated with FR2 instead of indicating subcarrier spacing. For example, the subcarrierSpacingCommon field is not necessarily needed to indicate subcarrier spacing when the subcarrier spacing is the same for an SSB and an initial downlink bandwidth part (the subcarrierSpacingCommon field becomes redundant if used for this purpose), so the subCarrierSpacingCommon field can be repurposed to indicate the QCL relation parameter associated with FR2 instead of indicating the subcarrier spacing.

Note that the signaling comprising the subCarrierSpacingCommon field may further include other fields comprising one or more bits for purposes other than determining the QCL relation parameter, such as one or more other fields of a MIB (e.g., systemFrameNumber, dmrs-TypeA-Position, pdcch-ConfigSIB1, PDCCH-ConfigSIB1, cellBarred, intraFreqReselection, etc.). Certain embodiments receive the signaling via broadcast from the network node, for example, via a PBCH. The network node may broadcast repetitions (or updates) of the signaling on a periodic basis, for example, to assist wireless devices entering coverage of a cell of the network node in acquiring time and/or frequency synchronization with the cell. Thus, in some cases the wireless device may receive a repetition (or update) of the subCarrierSpacingCommon field.

The method of FIG. 13 proceeds to step 1304 with using the QCL relation parameter associated with FR2 when performing an operation of the wireless device for FR2. For example, the operation of the wireless device may comprise assuming quasi co-location for SS and PBCH blocks transmitted with a same block index on a same center frequency location. Certain embodiments determine the block index as a modulo of a block index indication indicated by an SS/PBCH block received from the network node and the QCL relation parameter. In certain embodiments, the quasi co-location may be assumed with respect to one or more of: Doppler spread, Doppler shift, average gain, average delay, delay spread, and/or spatial receive (Rx) parameters.

Certain embodiments further comprise determining a QCL relation parameter associated with FR1 and using the QCL relation parameter associated with FR1 when performing an operation of the wireless device for FR1. The QCL relation parameter associated with FR1 is determined based on a subCarrierSpacingCommon field for FR1 and a ssbSubcarrierOffset field for FR1, each of which is received in the signaling from the network node. In certain embodiments, the QCL relation parameter associated with FR1 is determined based on only two bits received from the network node, one bit received in the subCarrierSpacingCommon field for FR1 and the other bit received in the ssb-SubcarrierOffset field for FR1.

Figure 14:
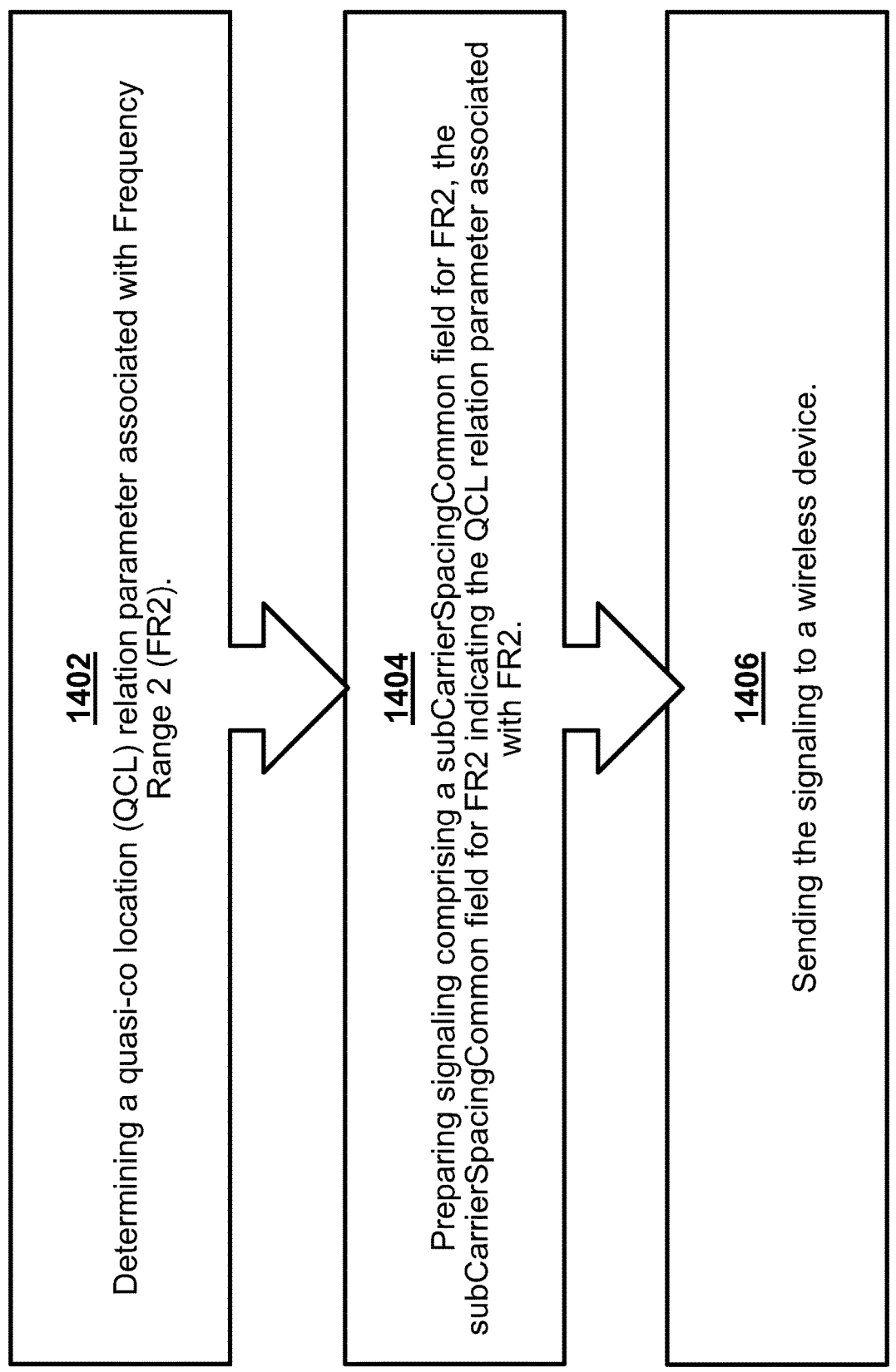
FIG. 14 illustrates an example of a method that may be performed by a network node in accordance with some embodiments.

FIG. 14 illustrates an example of a method performed by a network node in accordance with certain embodiments. In an embodiment, the method of FIG. 14 may be performed by a network node 160. For example, network node 160 may comprise processing circuitry 170 configured to perform the steps of the method. In an embodiment, the processing circuitry 170 may execute instructions of a computer program that cause the network node to perform the method. In certain embodiments, the network node operates in unlicensed spectrum with respect to at least FR2. In certain embodiments, the steps performed by the network node in FIG. 14 may support a wireless device performing the method of FIG. 13. As an example, signaling sent from the network node in FIG. 14 may be received by the wireless device in FIG. 13 to support the wireless device in determining the QCL relation parameter.

The method of FIG. 14 begins at step 1402 with determining a QCL relation parameter associated with FR2. The method proceeds to step 1404 with preparing signaling to be sent in order to indicate the QCL relation parameter associated with FR2. The signaling comprises a subCarrierSpacingCommon field of a master information block for FR2. The subCarrierSpacingCommon field for FR2 indicates the QCL relation parameter associated with FR2. The method then continues to step 1406 with sending the signaling to a wireless device. As an example, the signaling may be sent via broadcast to one or more wireless devices within a coverage area of the network node. Certain embodiments broadcast the signaling via a PBCH.

In certain embodiments, the QCL relation parameter associated with FR2 is indicated by the network node using only the subCarrierSpacingCommon field for FR2 without using any other field sent in the signaling to the wireless device. For example, in certain embodiments, the QCL relation parameter associated with FR2 is indicated based on a single bit sent to the wireless device, the single bit sent in the subCarrierSpacingCommon field for FR2. The subCarrierSpacingCommon field for FR2 may be a one-bit field configured to indicate either a first value or a second value of the QCL relation parameter associated with FR2. For example, as discussed above (e.g., "Embodiment #3), in case the SSB and initial downlink bandwidth part sub-carrier spacing is the same, the one-bit-field subCarrierSpacingCommon becomes redundant and can be used to signal two values of $$N_{SSB}^{QCL}.$$

In one non-limiting example, the values are 32 and 64.

Thus, in certain embodiments, the subCarrierSpacingCommon field for FR2 indicates the QCL relation parameter associated with FR2 instead of indicating subcarrier spacing. For example, the subcarrierSpacingCommon field is not necessarily needed to indicate subcarrier spacing when the subcarrier spacing is the same for an SSB and an initial downlink bandwidth part (the subcarrierSpacingCommon field becomes redundant if used for this purpose), so the subCarrierSpacingCommon field can be repurposed to indicate the QCL relation parameter associated with FR2 instead of indicating the subcarrier spacing.

As discussed above with respect to FIG. 13, the signaling comprising the subCarrierSpacingCommon field may further include other fields comprising one or more bits for purposes other than determining the QCL relation parameter, such as one or more other fields of a MIB, and the network node may broadcast repetitions (or updates) of the signaling on a periodic basis.

In certain embodiments, the signaling sent to the wireless device further comprises a subCarrierSpacingCommon field for FR1 and a ssb-SubcarrierOffset field for FR1. Together, these fields indicate a QCL relation parameter associated with FR1. For example, in certain embodiments, only two bits sent from the network node to the wireless device are used to indicate the QCL relation parameter associated with FR1, one bit sent in the subCarrierSpacingCommon field for FR1 and the other bit sent in the ssb-SubcarrierOffset field for FR1. In this manner, certain embodiments may use different signaling with respect to the QCL relation parameter associated with FR1 (e.g., subCarrierSpacingCommon field and ssb-SubcarrierOffset field) than that used for the QCL relation parameter associated with FR2 (e.g., subCarrierSpacingCommon field by itself). In embodiments that use two bits to indicate the QCL relation parameter associated with FR1, the two bits may be configured to indicate one of four possible values, for example:

| subCarrierSpacingCommon | ssb-SubcarrierOffset | QCL relation parameter |
|---|---|---|
| 0 | 0 | [first value] |
| 0 | 1 | [second value] |
| 1 | 0 | [third value] |
| 1 | 1 | [fourth value] |

In certain embodiments, sending the signaling that indicates the QCL relation parameter may assist the wireless device in performing certain operations, such as listen-before-talk operations in unlicensed spectrum. In certain embodiments, the QCL relation parameter indicates that the wireless device is to assume that SS and PBCH blocks transmitted with a same block index on a same center frequency location are quasi co-located with respect to one or more of: Doppler spread, Doppler shift, average gain, average delay, delay spread, and/or spatial receive (Rx) parameters. In certain embodiments, the signaling sent to the wireless device further comprises a block index indication indicated by an SS/PBCH block, wherein the block index indication enables the wireless device to determine the block index as a modulo of the block index indication and the QCL relation parameter.

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods described herein without departing from the scope of the disclosure. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the scope of this disclosure, as defined by the following claims.

The invention claimed is:

1. A method performed by a wireless device, the method comprising:

determining a quasi-co location (QCL) relation parameter associated with Frequency Range 2 (FR2), the QCL relation parameter associated with FR2 determined based on a subCarrierSpacingCommon field of a master information block for FR2 received in signaling from a network node, wherein the subCarrierSpacingCommon field for FR2 indicates the QCL relation parameter associated with FR2 instead of indicating the subcarrier spacing when the subcarrier spacing is the same for a synchronization signal block (SSB) and an initial downlink bandwidth part; and using the QCL relation parameter associated with FR2 when performing an operation of the wireless device for FR2.

2. The method of claim 1, wherein the QCL relation parameter associated with FR2 is determined using the subCarrierSpacingCommon field for FR2 without using any other field received in the signaling from the network node.

3. The method of claim 1, wherein the QCL relation parameter associated with FR2 is determined based on a single bit received from the network node, the single bit received in the subCarrierSpacingCommon field for FR2.

4. The method of claim 1, wherein the subCarrierSpacingCommon field for FR2 indicates the QCL relation parameter associated with FR2 instead of indicating subcarrier spacing.

5. The method of claim 1, wherein the subCarrierSpacingCommon field for FR2 is a one-bit field configured to indicate either a first value or a second value of the QCL relation parameter associated with FR2.

6. The method of claim 5, wherein the first value is 32 and the second value is 64.

7. The method of claim 1, wherein the wireless device operates in unlicensed spectrum in the FR2.

8. The method of claim 1, further comprising:

determining a QCL relation parameter associated with Frequency Range 1 (FR1), the QCL relation parameter associated with FR1 determined based on a subCarrierSpacingCommon field for FR1 and a ssb-SubcarrierOffset field for FR1, the subCarrierSpacingCommon field for FR1 and the ssb-SubcarrierOffset field for FR1 received in the signaling from the network node; and using the QCL relation parameter associated with FR1 when performing an operation of the wireless device for FR1.

9. The method of claim 8, wherein the QCL relation parameter associated with FR1 is determined based on only two bits received from the network node, one bit received in the subCarrierSpacingCommon field for FR1 and the other bit received in the ssb-SubcarrierOffset field for FR1.

10. The method of claim 1, wherein the operation of the wireless device comprises assuming that synchronization signal (SS) and physical broadcast channel (PBCH) blocks transmitted with a same block index on a same center frequency location are quasi co-located with respect to one or more of: Doppler spread, Doppler shift, average gain, average delay, delay spread, and/or spatial receive (Rx) parameters.

11. The method of claim 10, wherein the block index is determined as a modulo of a block index indication indicated by an SS/PBCH block and the QCL relation parameter.

12. A wireless device, the wireless device comprising:

power supply circuitry configured to supply power to the wireless device; and processing circuitry configured to:

determine a quasi-co location (QCL) relation parameter associated with Frequency Range 2 (FR2), the QCL relation parameter associated with FR2 determined based on a subCarrierSpacingCommon field of a master information block for FR2 received in signaling from a network node, wherein the subCarrierSpacingCommon field for FR2 indicates the QCL relation parameter associated with FR2 instead of indicating the subcarrier spacing when the subcarrier spacing is the same for a synchronization signal block (SSB) and an initial downlink bandwidth part; and use the QCL relation parameter associated with FR2 when performing an operation of the wireless device for FR2.

13. The wireless device of claim 12, wherein the subCarrierSpacingCommon field for FR2 is a one-bit field configured to indicate either a first value or a second value of the QCL relation parameter associated with FR2.

14. The wireless device of claim 13, wherein the first value is 32 and the second value is 64.

15. A method performed by a network node, the method comprising:

sending, to a wireless device, signaling comprising a subCarrierSpacingCommon field of a master information block for Frequency Range 2 (FR2), the subCarrierSpacingCommon field for FR2 indicating a quasi-co location (QCL) relation parameter associated with FR2, wherein the subCarrierSpacingCommon field for FR2 indicates the QCL relation parameter associated with FR2 instead of indicating the subcarrier spacing when the subcarrier spacing is the same for a synchronization signal block (SSB) and an initial downlink bandwidth part.

16. The method of claim 15, wherein the subCarrierSpacingCommon field for FR2 is a one-bit field configured to indicate either a first value or a second value of the QCL relation parameter associated with FR2, wherein the first value is 32 and the second value is 64.

17. A network node, the network node comprising:

power supply circuitry configured to supply power to the network node; and processing circuitry configured to:

send, to a wireless device, signaling comprising a subCarrierSpacingCommon field of a master information block for Frequency Range 2 (FR2), the subCarrierSpacingCommon field for FR2 indicating a quasi-co location (QCL) relation parameter associated with FR2, wherein the subCarrierSpacingCommon field for FR2 indicates the QCL relation parameter associated with FR2 instead of indicating the subcarrier spacing when the subcarrier spacing is the same for a synchronization signal block (SSB) and an initial downlink bandwidth part.

18. The network node of claim 17, wherein the subCarrierSpacingCommon field for FR2 is a one-bit field configured to indicate either a first value or a second value of the QCL relation parameter associated with FR2, wherein the first value is 32 and the second value is 64.

* * * * *